(12) United States Patent
Elsheemy

(10) Patent No.: US 10,229,592 B1
(45) Date of Patent: Mar. 12, 2019

(54) METHOD ON-BOARD VEHICLES TO PREDICT A PLURALITY OF PRIMARY SIGNS OF DRIVING WHILE IMPAIRED OR DRIVING WHILE DISTRACTED

(71) Applicant: Mohamed Roshdy Elsheemy, Akron, OH (US)

(72) Inventor: Mohamed Roshdy Elsheemy, Akron, OH (US)

( * ) Notice: Subject to any disclaimer, the term of this patent is extended or adjusted under 35 U.S.C. 154(b) by 0 days.

(21) Appl. No.: 15/732,414

(22) Filed: Nov. 7, 2017

(51) Int. Cl.
| | |
|---|---|
| *G08G 1/0967* | (2006.01) |
| *B60T 8/172* | (2006.01) |
| *G08G 1/096* | (2006.01) |
| *G08G 1/052* | (2006.01) |
| *G08G 1/0962* | (2006.01) |
| *B60T 7/12* | (2006.01) |

(52) U.S. Cl.
CPC .......... *G08G 1/096725* (2013.01); *B60T 7/12* (2013.01); *B60T 8/172* (2013.01); *G08G 1/052* (2013.01); *G08G 1/096* (2013.01); *G08G 1/09626* (2013.01); *B60T 2201/081* (2013.01); *B60T 2201/082* (2013.01); *B60T 2201/083* (2013.01); *B60T 2201/089* (2013.01); *B60Y 2302/03* (2013.01); *B60Y 2302/05* (2013.01)

(58) Field of Classification Search
USPC .................................................. 701/710, 70
See application file for complete search history.

(56) References Cited

U.S. PATENT DOCUMENTS

| | | | | |
|---|---|---|---|---|
| 9,884,628 | B1* | 2/2018 | Grant | B60W 40/08 |
| 2008/0189000 | A1* | 8/2008 | Duong | B60T 7/22 |
| | | | | 701/20 |
| 2010/0004839 | A1* | 1/2010 | Yokoyama | G08G 1/052 |
| | | | | 701/70 |
| 2010/0063736 | A1* | 3/2010 | Hoetzer | B60W 30/09 |
| | | | | 701/301 |
| 2013/0342336 | A1* | 12/2013 | Kiefer | B60W 50/14 |
| | | | | 340/436 |
| 2014/0156157 | A1* | 6/2014 | Johnson | B60T 7/22 |
| | | | | 701/70 |
| 2014/0306826 | A1* | 10/2014 | Ricci | H04W 4/21 |
| | | | | 340/573.1 |
| 2015/0015420 | A1* | 1/2015 | Miller | G08G 1/095 |
| | | | | 340/907 |
| 2015/0127191 | A1* | 5/2015 | Misra | G08G 1/0112 |
| | | | | 701/1 |
| 2016/0068143 | A1* | 3/2016 | Schanz | B60W 10/184 |
| | | | | 701/70 |
| 2018/0075747 | A1* | 3/2018 | Pahwa | B60W 40/09 |

FOREIGN PATENT DOCUMENTS

CA         2010-Q73934      * 4/2010 ............ B60K 28/06

* cited by examiner

*Primary Examiner* — Tyler D Paige

(57) ABSTRACT

A method on-board vehicles for predicting a plurality of primary signs of driving while impaired or driving while distracted, and preventing running red lights at predefined intersections by a traveling vehicle, the method comprising integrating the autonomous in-vehicle virtual traffic light system with the in-vehicle's cameras and the automatic braking of the vehicle.

7 Claims, 12 Drawing Sheets

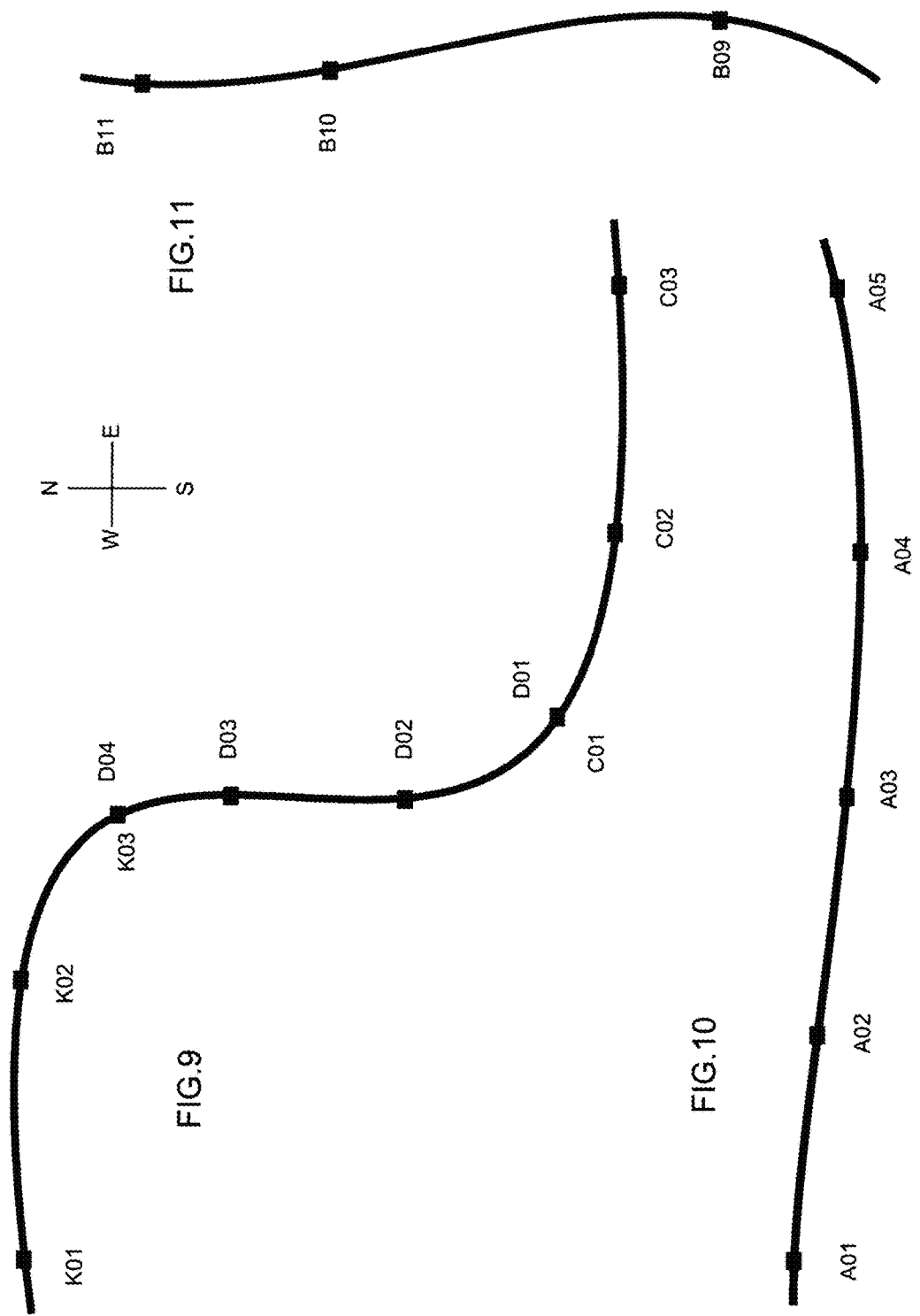

Table Section_Location

| LatA | LonA | Location_ID |
|---|---|---|
| 41.6 | -81.2 | 44114 |
| 41.5 | -81.2 | 44114 |
| 41.5 | -81.3 | 44114 |
| ....... | ....... | ........... |
| 41.5 | -82.1 | 44114 |
| 41.4 | -81.2 | 44114 |
| ....... | ....... | ........... |
| 41.4 | -82.1 | 44114 |
| 41.3 | -81.2 | 44114 |
| ....... | ....... | ........... |
| 41.3 | -82.1 | 44114 |
| 41.2 | -81.2 | 44308 |
| ....... | ....... | ........... |
| ....... | ....... | ........... |
| 41.0 | -81.5 | 44308 |
| ....... | ....... | ........... |
| ....... | ....... | ........... |
| 40.9 | -81.7 | 44308 |
| ....... | ....... | ....... |

FIG.14

Table 44308 Segment ID

| Latitude | Longitude | Segment ID |
|---|---|---|
| 41.04664 | -81.52749 | |
| | | 2WIL1314 |
| 41.04672 | -81.51019 | |
| | | 1BRO2021 |
| 41.03985 | -81.50741 | |
| | | 1BRO2021 |
| 41.02883 | -81.51048 | |
| | | 2WAT1718 |
| 41.02867 | -81.52698 | |
| | | 1HIG1011 |
| 41.03609 | -81.52990 | |
| | | 1HIG1011 |
| 41.04001 | -81.52695 | |
| | | 1HIG1011 |
| 41.04664 | -81.52749 | |
| | | |

FIG.15

Table Cases ID

| H.int ID | V.int ID | Latitude | Longitude | Cases | Delay |
|---|---|---|---|---|---|
| WIL13 | HIG11 | 41.04664 | -81.52749 | 101002 | 20 |
| WIL14 | BRO21 | 41.04672 | -81.51019 | 203010 | 35 |
| WAT18 | BRO20 | 41.02883 | -81.51048 | 404010 | 35 |
| WAT17 | HIG10 | 41.02867 | -81.52698 | 205010 | 50 |
|  |  |  |  |  |  |
|  |  |  |  |  |  |

FIG.16

Table Cases_ Timing for Model (3,4,5,6)

| Case_ID | Timing |
|---|---|
| 30 | 90802020 |
| 31 | 80602000 |
| ... | ... |
| 40 | 60601515 |
| 41 | 60600015 |
| ... | ... |
| 50 | 99602515 |
| 51 | 60601515 |
| ... | ... |
| 60 | 60801525 |
| 61 | 80602020 |
| ... | ... |
|  |  |

FIG.17

Table Cases ID for M.L int(6 Legs)

| M.L int ID | Latitude | Longitude | Order | Cases | Delay |
|---|---|---|---|---|---|
| BRI19 | 41.08472 | -81.46702 | 1 | 707172 | 40 |
| LAN15 | 41.08472 | -81.46702 | 2 | 707172 | 40 |
| WOD22 | 41.08472 | -81.46702 | 3 | 707172 | 40 |
| BRI19 | 41.08472 | -81.46702 | 4 | 707172 | 40 |
| LAN15 | 41.08472 | -81.46702 | 5 | 707172 | 40 |
| WOD22 | 41.08472 | -81.46702 | 6 | 707172 | 40 |
|  |  |  |  |  |  |
|  |  |  |  |  |  |
|  |  |  |  |  |  |
|  |  |  |  |  |  |

FIG.18

Table Cases_ Timing for Model 7

| Case_ID | Timing |
|---|---|
| 70 | 605045202020 |
| 71 | 404030200015 |
| 72 | 302525101000 |
|  |  |

FIG.19

Table 44308 Sign ID

| | Latitude | Longitude | Sign ID |
|---|---|---|---|
| 80 | 41.04664 | -81.52749 | |
| | | | 210111213 |
| 82 | 41.04672 | -81.51019 | |
| | | | 114151617 |
| 84 | 41.03985 | -81.50741 | |
| | | | 118191819 |
| 86 | 41.02883 | -81.51048 | |
| | | | 220212021 |
| 88 | 41.02867 | -81.52698 | |
| | | | 122232425 |
| 90 | 41.03609 | -81.52990 | |
| | | | 122232425 |
| 92 | 41.04001 | -81.52695 | |
| | | | 122232425 |
| 94 | 41.04664 | -81.52749 | |

METHOD ON-BOARD VEHICLES TO PREDICT A PLURALITY OF PRIMARY SIGNS OF DRIVING WHILE IMPAIRED OR DRIVING WHILE DISTRACTED

CROSS-REFERENCE TO RELATED APPLICATION(S)

The present application claims priority to U.S. application Ser. No. 14/999,005 filed on Mar. 16, 2016, entitled "Running Red Lights Avoidance and Virtual Preemption System" the entire disclosure of which are incorporated by reference herein. This application further incorporates by reference herein the entire disclosure of U.S. application Ser. No. 14/544,801 filed on Feb. 20, 2015 and is referred herein as Elsheemy, [Also U.S. Provisional Application No. 62/285,455].

Applicant acknowledge that the autonomous in-vehicle virtual traffic light system is allowable based on application Ser. No. 15/803,414 Examiner Flores Leon.

FIELD OF THE INVENTION

The present invention relates generally to traffic control systems and more particularly to methods on-board vehicles to predict a plurality of primary signs of driving while impaired or driving while distracted, and to prevent running red lights.

BACKGROUND OF THE INVENTION

Driving while impaired or distracted—alcohol and drugs and dangers of running red lights:
- An estimated 32% of fatal car crashes involve an intoxicated driver or pedestrian. (NHTSA)
- 3,952 fatally injured drivers tested positive for drug involvement. (FARS)
- Over 1.2 million drivers were arrested in 2011 for driving under the influence of alcohol or narcotics. (FBI)
- Car crashes are the leading cause of death for teens, and about a quarter of those crashes involve an underage drinking driver. (SAMHSA)
- On average, two in three people will be involved in a drunk driving crash in their lifetime. (NHTSA)

Alcohol, drugs and driving simply do not go together. Driving requires a person's attentiveness and the ability to make quick decisions on the road, to react to changes in the environment and execute specific, often difficult maneuvers behind the wheel. When drinking alcohol, using drugs, or being distracted for any reason, driving becomes dangerous—and potentially lethal!

Despite increased public awareness, drinking and drugged driving continues:
- In 2012, 29.1 million people admitted to driving under the influence of alcohol—that's more than the population of Texas.
- According to the 2013 National Survey on Drug Use and Health (NSDUH), an estimated 9.9 million people aged 12 or older (or 3.8 percent of adolescents and adults) reported driving under the influence of illicit drugs during the year prior to being surveyed.

Alcohol:

Alcohol is a depressant because it slows down the functions of the central nervous system. This means that normal brain function is delayed, and a person is unable to perform normally. Alcohol affects a person's information-processing skills, also known as cognitive skills, and hand-eye coordination, also referred to as psychomotor skills.

Consuming alcohol prior to driving greatly increases the risk of car accidents, highway injuries, and vehicular deaths. The greater the amount of alcohol consumed, the more likely a person is to be involved in an accident. When alcohol is consumed, many of the skills that safe driving requires—such as judgment, concentration, comprehension, coordination, visual acuity, and reaction time—become impaired.

Drugs:

Americans know the terrible consequences of drunk driving and are becoming more aware of the dangers of distracted driving. Drugged driving poses similar threats to public safety because drugs have adverse effects on judgment, reaction time, motor skills, and memory. When misused, prescription drugs, over-the-counter drugs, and illegal drugs can impair perception, judgment, motor skills, and memory.

According to the National Highway Traffic Safety Administration's (NHTSA) National Roadside Survey, more than 16% of weekend, nighttime drivers tested positive for illegal, prescription, or over-the-counter medications (11% tested positive for illegal drugs). In 2009, 18% of fatally injured drivers tested positive for at least one drug (illegal, prescription and/or over-the-counter).

According to NSDUH data, men are more likely than women to drive under the influence of an illicit drug or alcohol. And young adults aged 18 to 25 are more likely to drive after taking drugs than other age groups.

Youth:

Vehicle accidents are the leading cause of death among young people aged 16 to 19. When teens' relative lack of driving experience is combined with the use of marijuana or other substances that affect cognitive and motor abilities, the results can be tragic.

In 2011, 12 percent of high school seniors responding to the Monitoring the Future survey admitted to driving under the influence of marijuana in the 2 weeks prior to the survey.

Marijuana and Driving:

Since marijuana is the second most commonly used drug associated with drinking and drugged driving after alcohol, it is important to understand why it is particularly dangerous.

THC, the high producing element in marijuana, affects areas of the brain that control body movements, balance, coordination, memory and judgment. Evidence from both real and simulated driving studies indicate that marijuana negatively affects a driver's attentiveness, perception of time and speed, and ability to draw on information obtained from past experiences. Research also shows that impairment increases significantly when marijuana use is combined with alcohol. Studies have found that many drivers test positive for alcohol and THC, making it clear that drinking and drugged driving are often linked behaviors.

Driving Under the Influence (DUI) is a Crime:

Driving under the influence (DUI), also known as driving while intoxicated (DWI), drunk driving, or impaired driving is the crime of driving a motor vehicle while impaired by alcohol or drugs, including those prescribed by physicians.

With alcohol, a drunk driver's level of intoxication is typically determined by a measurement of blood alcohol content or BAC. A BAC measurement in excess of a specific threshold level, such as 0.05% or 0.08%, defines the criminal offense with no need to prove impairment. In some jurisdictions, there is an aggravated category of the offense at a higher BAC level, such as 0.12%.

All 50 states and the District of Columbia have laws that specifically target drugged drivers. Almost one-third of states have adopted the per se standard that forbid any presence of a prohibited substance or drug in the driver's body while in control of the vehicle, without any other evidence of impairment. Others have established specific limits for the presence of intoxicating drugs, while still others follow a zero tolerance rule with regards to the presence of intoxicating drugs in a person's system.

Being convicted of driving under the influence of drugs or alcohol can impact your life in ways you may not be aware of, including loss of employment, prevention of employment in certain jobs, higher insurance rates, serious financial setbacks, personal and family embarrassment, and possible incarceration.

The consequences of driving while impaired are far reaching, and the effects impact not only impaired drivers, but many, many others.

Distracted Driving:

Along with the dangerous implications of drinking or drugging and driving, the dangers of distracted driving are becoming increasingly prevalent across American society.

Distracted driving activities include things like using a cell phone, texting, and eating. Using in-vehicle technologies (such as navigation systems) can also be sources of distraction. While any of these distractions can endanger the driver and others, texting while driving is especially dangerous because it combines all three types of distraction: visual—taking your eyes off the road; manual—taking your hands off the wheel; and cognitive—taking your mind off of driving.

Unfortunately, speeding and distracting while driving, as well as inability to see the traffic control device in time to comply are common problems. also not every vehicle driver conscious to follow the law. Sometimes, people are too impatient or too rushed to stop for the red light. They charge through the intersection, risking a wreck in their impatience to get where they are going without stopping. It's very obvious and common sense that running a red light would be dangerous and can cause an accident. After all, if you have a red light, the other traffic has a green light and is expecting to be able to continue through the intersection without any problems. Ignoring traffic signals is one of the major causes of accidents. Red-light running is estimated to cause more than 170,000 injuries and approximately 900 deaths per year in the US (SOURCE: Federal Highway Administration Red-Light Running Web Site (2008), According to some major cities, car crashes that occur as a result of running red lights can annually cost the states dozens of US$ billion.

Even though clearance intervals—both lengthening yellow—change intervals as well as providing an all—red clearance interval—together with increasing the size of signal lenses, have been shown to improve intersection safety. Increasing the length of the yellow-change interval in accordance with the recommended Institute for Transportation Engineers (ITE) formula has been shown to slightly decrease the chance of red-signal violations. Providing red clearance intervals and increasing the yellow-change interval have been shown to slightly decrease late exits from intersections since distracting while driving still responsible for the majority of Running Red Lights.

SUMMARY OF THE INVENTION

The present autonomous in-vehicle virtual traffic light system:

The vehicle unit and the visual display unit as being disclosed in U.S. application Ser. No. 14/544,801, (Elsheemy) in addition to as being disclosed in here is referred herein as V10 and is comprising flash memory and ROM as a component of the vehicle unit circuit board serve as a storage location for the unit, they store computer program code for programs of the present system and other systems of Elsheemy. They also store database comprising position coordinates of track points along center line of roads and at center points of intersections for determining geographic sections and leg segments of intersections, a plurality of predefined traffic Cases, threshold delay times, green and turning times for the predefined traffic Cases, and position coordinates of track points along center line of roads for determining road sign images, a predefined traffic Case basically is a double digit code to identify a traffic Case which holds the values of green and arrow turning times for just one segment per each road of an intersection, where a vehicle is traveling on a segment of a predefined intersection, the vehicle extracts a traffic Case from the database, the segment and the heading of the vehicle prompts a section of a programming code associated with a type of a traffic Case to display traffic signal phases autonomously. This section of the programming code belongs to just one segment of an intersection, while other sections belong to the other remaining segments and these sections are configured to coordinate the traffic signal phases for the whole intersection. The whole programming code for all legs of an intersection is called a Case Model.

The vehicle unit further comprises at least one GPS receiver module to enable the vehicle to determine its position coordinates, speed, course and date/time at real-time status.

The vehicle unit further comprises at least one processor being coupled to said database and said memory.

A visual display such as a touch screen or other types of displays coupled to said vehicle unit to display traffic signal phases associated with a predefined Case and to display road sign images associated with a road. Furthermore, the visual display also displays instructions directed to the vehicle driver along with audible alerts and messages.

Predicting many of the primary signs of driving while impaired or driving while distracted and preventing running red light signals by a vehicle:

Monitoring, recording and analyzing a group of elements generated by the present autonomous in-vehicle virtual traffic light system in test vehicles driven by impaired test drivers then to use the results in building mathematic formulas used inside the vehicle software to predict many of the primary signs of driving while impaired or driving while distracted.

The present invention integrates the present autonomous in-vehicle virtual traffic light system with the automatic braking in vehicles. Wherein, the vehicle can determine the red light phase at every predefined upcoming intersection ahead of time, thus to take an appropriate automatic action.

Similarly, when the in-vehicle software detects multiple signs of driving while impaired or driving while distracted, the automatic brakes is activated to gradually drop the vehicle's speed to safe levels such as under 20 mph and the LCD displays visual and audible warning to the driver to stop his vehicle to the side of the road safely along with activating the front and the rear flashers of the vehicle.

BRIEF DESCRIPTION OF THE DRAWINGS

FIG. 9 Illustrates an example of numbering the intersections on a horizontal street section coded C joins a vertical street section coded D joins a horizontal street section coded K.

FIG. 10 Illustrates an example of numbering the intersections on a horizontal street coded A.

FIG. 11 Illustrates an example of numbering the intersections on a vertical street coded B.

FIG. 14 Illustrates an example of SQL table Section_Location to locate a specific geographical section.

FIG. 15 Illustrates an example of SQL table to link between position coordinates on a leg-segment between two consecutive intersections on the same street and segment ID.

FIG. 16 Illustrates an example of SQL table to link between intersection ID for regular intersections (4-leg or 3-leg) and traffic Case IDs and the intersection coordinates.

FIG. 17 Illustrates an example of SQL table to link the traffic Cases for regular intersections and their respective times.

FIG. 18 Illustrates an example of SQL table to link between intersection ID for Multi-leg (6-legs) intersection and the leg order and traffic Case IDs and the intersection coordinates.

FIG. 19 Illustrates an example of SQL table to link the traffic Cases for Multi-leg (6-legs) intersection and their respective times.

DETAILED DESCRIPTION OF PREFERRED EMBODIMENTS

The autonomous in-vehicle virtual traffic light system:

In the most preferred embodiment of displaying the in-vehicle traffic light signals, the LCD screen displays the traffic signals in a form of geometric shapes such as squares or distinctive image icons, also the screen displays the road sign images such as speed limit, lane and intersection sign images and all other road sign images. The LCD also comprises a microphone, speaker, one or more cameras and a number of buttons for systems of Elsheemy. This unit may also comprise a bluetooth/WIFI module. In other embodiments of indicating the in-vehicle traffic light signals and the road sings, this indication could be via in-vehicle audible messages directed to the vehicle driver for cases such as motorcycles to enhance the safety of the driver while keeping his eyes on the road. Also, in other embodiments of indicating the in-vehicle traffic light signals, the road sings and the virtual preemption for both ordinary and emergency vehicles, this indication could be via in-vehicle computer codes directed to the vehicle computer system for cases such as autonomous vehicles "driverless cars".

The in-vehicle whole traffic light phases for all legs of an intersection are referred herein as a Case. The visual indication of an upcoming intersection programmed with a Case is shown as a geometric shape such as a big red or big yellow square or an image icon when the LCD screen is used to display the traffic light signals when the vehicle proximate to this intersection during yellow or red light phase, wherein the red light phase is shown as the big red square/icon, and the yellow light phase is shown as the big yellow square/icon, in addition to, an audible alert used for notification when the vehicle proximate to the intersection during yellow/red light phase, to increase the driver's awareness when his vehicle proximate to the intersection during yellow or red light phase.

The LCD unit may also comprise an LED intersection indicator to indicate the location of an intersection programmed with a traffic Case when the vehicle proximate to this intersection as previously mentioned.

In other embodiments the vehicle may include the LCD unit and/or a separate LED strip comprising LED indicators to indicate the in-vehicle traffic signals. The strip could be in a horizontal or a vertical orientation, and the LCD unit or the LED strip unit may comprise a bluetooth or WIFI module.

Furthermore, in other embodiments the vehicle unit may contain the LCD or the LED strip in the same housing.

The LCD or the LED strip along with the vehicle unit is referred herein as V10 unit.

Figure 1:
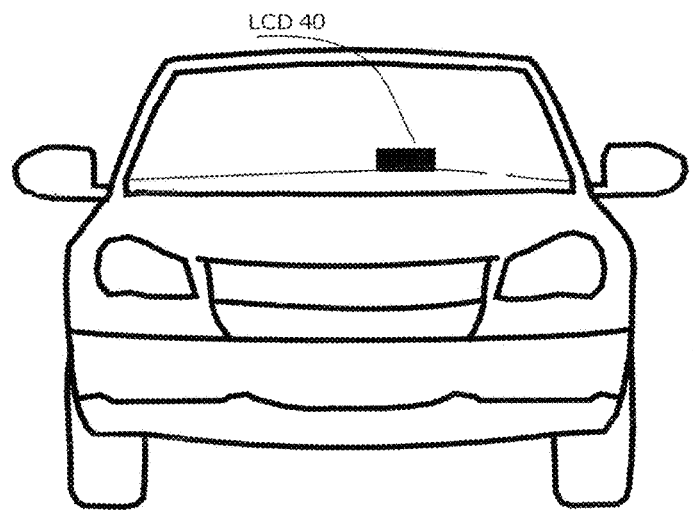
FIG. 1 Illustrates the location and the position of the vehicle LCD 40 unit inside the vehicle as a preferred embodiment of the present invention.
Figure 2:
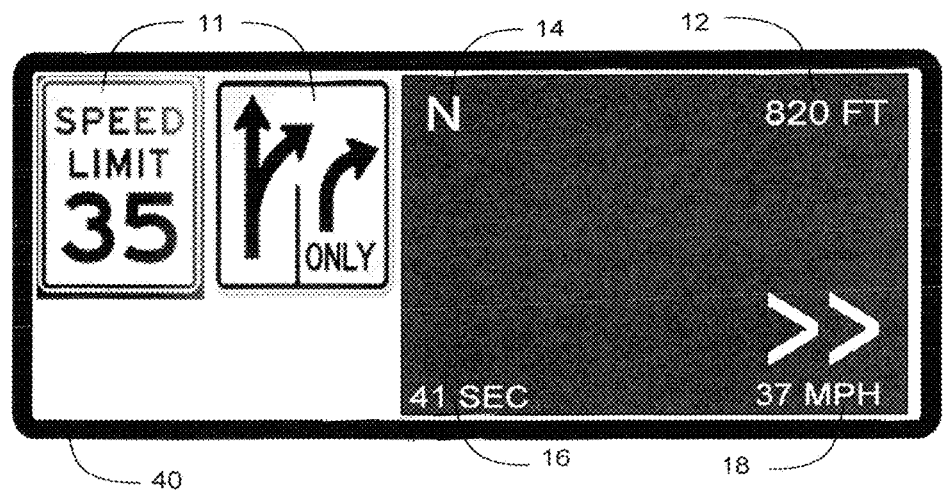
FIGS. 2-5 Illustrates examples of the vehicle LCD unit 40 (showing the traffic signal phases and images of road signs displayed on the LCD screen).
Figure 3:
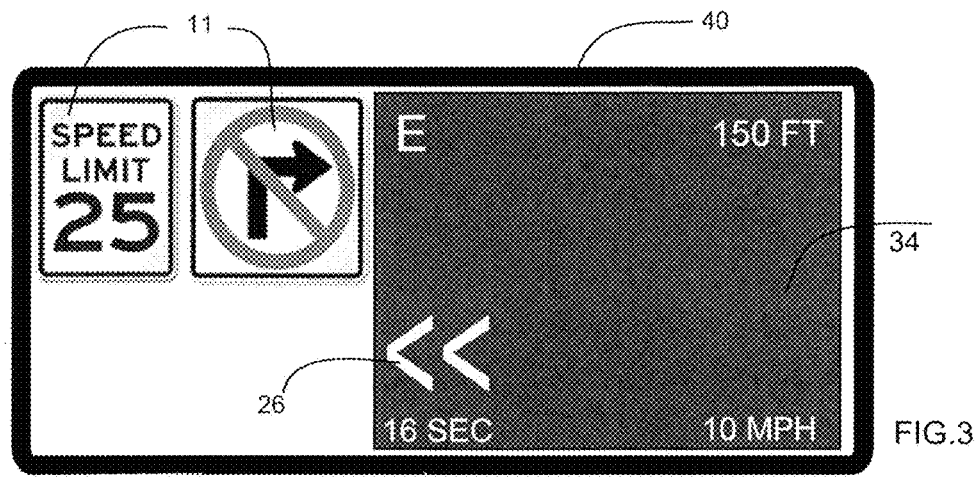
Figure 4:
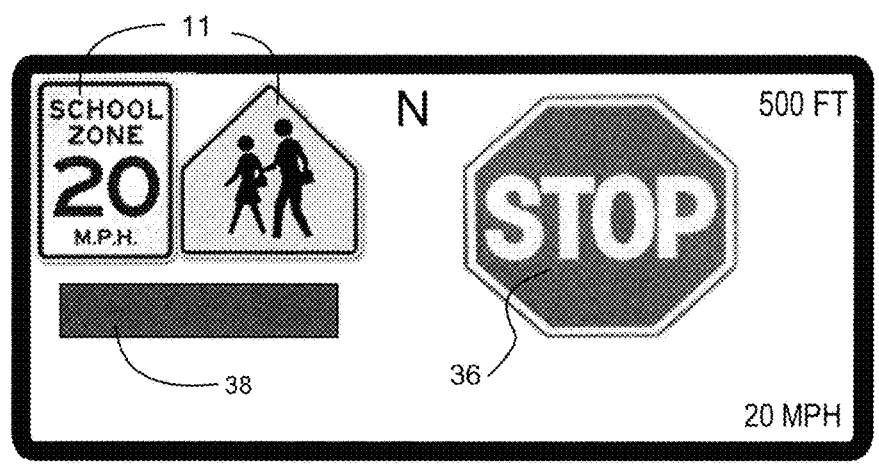
Figure 6:
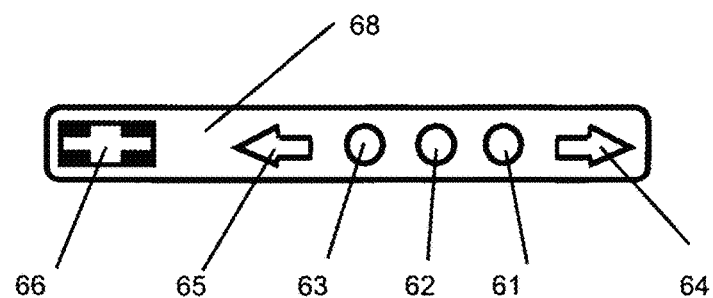
FIG. 6 Illustrates an example of a horizontal LED strip.
Figure 7:
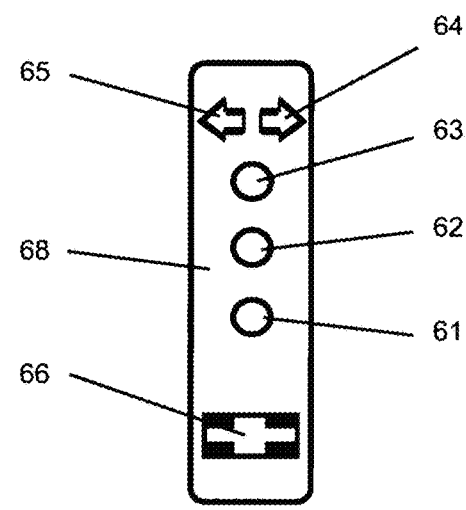
FIG. 7 Illustrates an example of a vertical LED strip.
Figure 8:
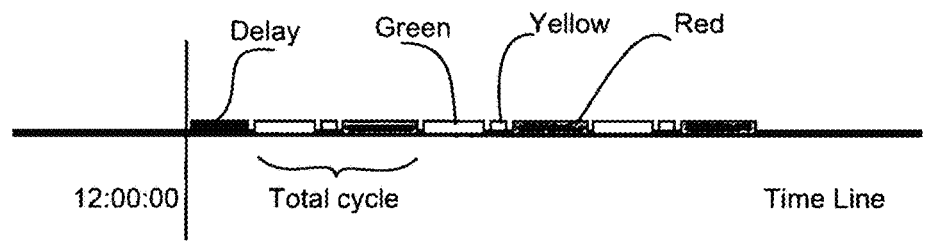
FIG. 8 Illustrates a timeline of a simple fixed traffic light cycle showing the threshold delay period before the beginning of the first cycle.

As shown in FIG. 1 the vehicle LCD unit 40 or the LED strip 68 in FIGS. 6 and 7 can be installed at any suitable location inside the vehicle to provide a comfortable line of sight with the driver, FIG. 1 is an example of the LCD 40 installed facing the driver without blocking his line of sight with the road, the LCD 40 or the LED strip 68 installed on top edge of the dash board as the most preferred location based on the field experiments.

As shown in FIGS. 2-5 the vehicle LCD unit 40 comprises a green light shape 20, yellow light shape 22, red light shape 24, big red light shape 34, big yellow light shape (not shown), green light shape for left turn arrow 26, yellow light shape for left turn arrow 27, green light shape for right turn arrow 30, yellow light shape for right turn arrow 32, stop sign image 36, yellow bar shape 38, road signs images 11, distance window 12 to show the distance between the vehicle and the upcoming intersection, course window 14 to show the heading of the traveling vehicle, remaining time window 16 to show the remaining time in seconds for the current signal phase and speed window 18 to show the speed of the vehicle.

As shown in FIGS. 6 and 7, the LED strip 68 comprises a green LED indicator 61, a yellow LED indicator 62, a red LED indicator 63, a green right arrow LED indicator 64, and a green left arrow LED indicator 65, the LED indicators illuminate the respective autonomous in-vehicle traffic light phases, also the intersection indicator 66 to illuminate only during red or yellow light phase when the vehicle is less than 350 meters away from the intersection.

The autonomous in-vehicle traffic light system is an in-vehicle virtual system that mimics the conventional street traffic signals. The system relies on a database of Latitude/Longitude of track points along the center line of roads and at the center of intersections, and a very small database of predefined Cases that fit all possible variation of traffic from the busiest traffic to the lowest traffic at street intersections during the different hours of the day, the Case stored inside the database as a couple digits for identification and few digits holds the values of green and turning arrow times relevant to just two leg segments of a two-road intersection, or holds the values of green and turning arrow times relevant to just three leg segments of a three-road intersection, to be used inside a Case Model's programming code associated with an intersection. A Case Model's programming code is referred herein as an in-vehicle virtual traffic controller, and is disclosed with great details in the following paragraphs.

The autonomous in-vehicle traffic light system neither depends on vehicle to vehicle communication nor intersection to vehicle communication nor vehicle to network communication, with extremely high efficiency that mimics and outperforms the actual street traffic signals and the conventional intersection traffic controllers.

A typical two-road intersection generally has four legs, each intersection leg is represented by a leg segment. Traffic lights are used to control safety and regulate traffic at intersections, by alternating the right of way accorded to the traveling vehicles.

Figure 20:
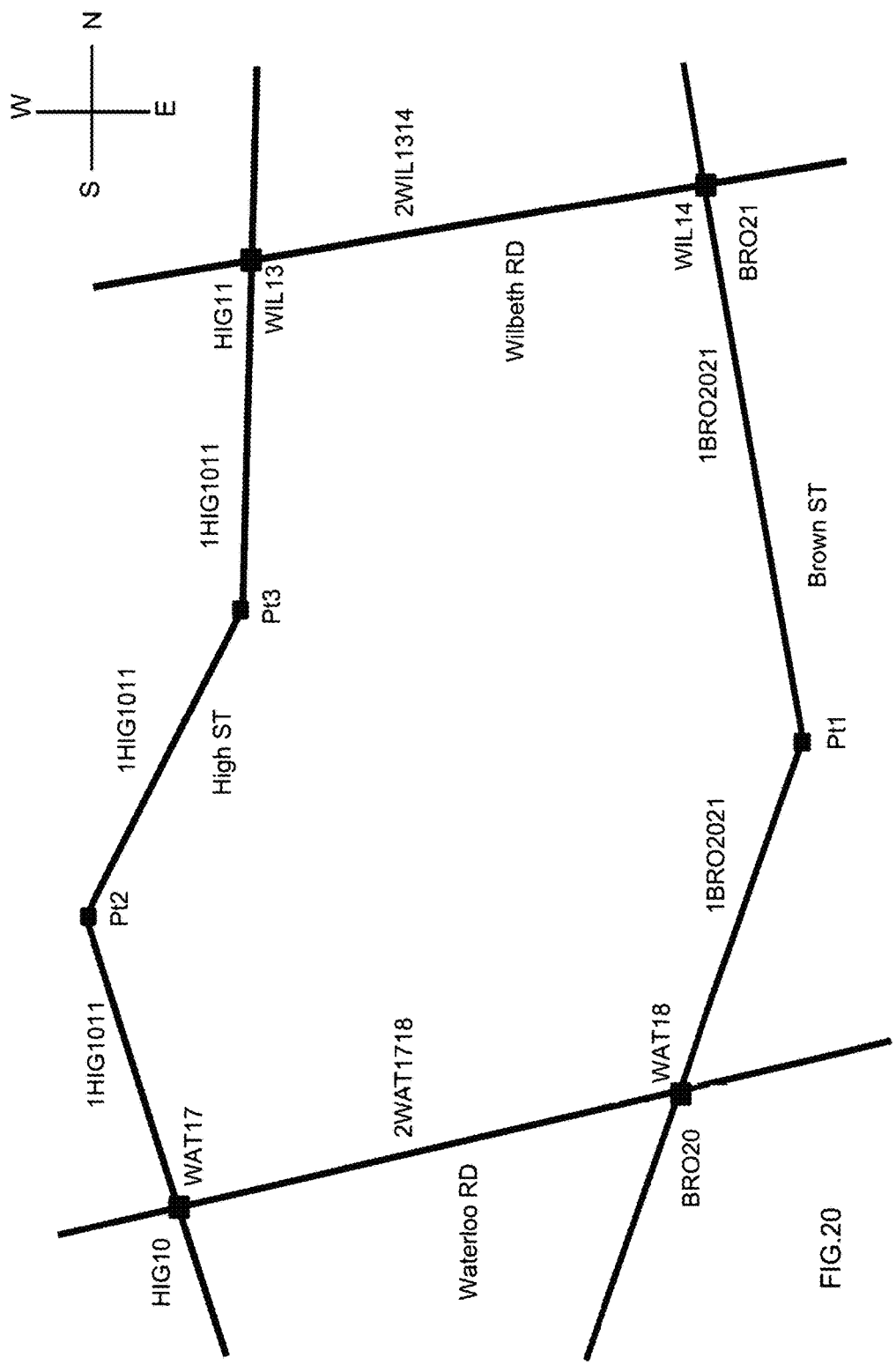
FIG. 20 Illustrates an example of the drop points at the center of the intersections and few drop points to represent the curvature of the segments between intersections.
Figures 22, 23:
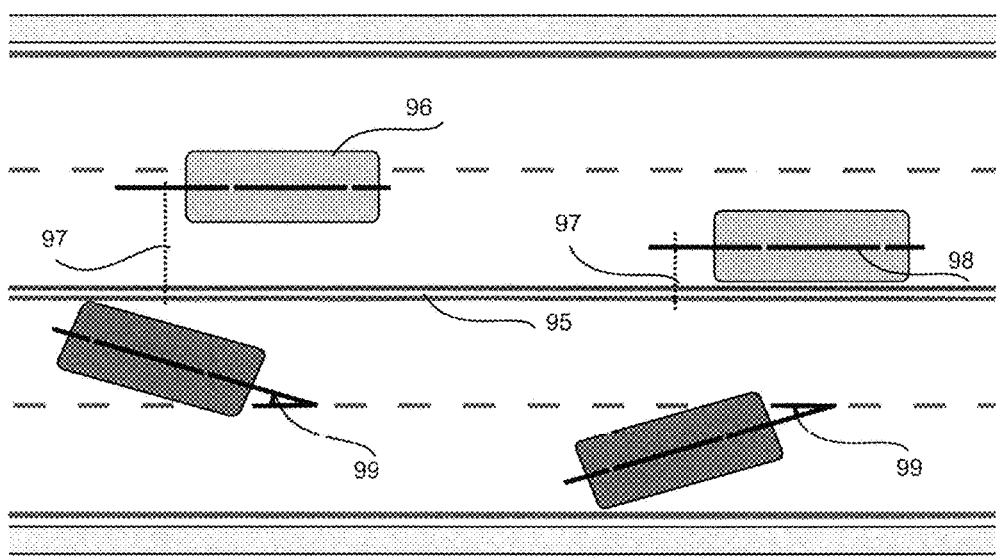
FIG. 22 Illustrates an example of SQL table to link between position coordinates of a vehicle on a road segment between two track points on the same street and a road sign image ID.
FIG. 23 Illustrates an example of a vehicle's behavior on a road segment between two track points on the same road.
Figure 24:
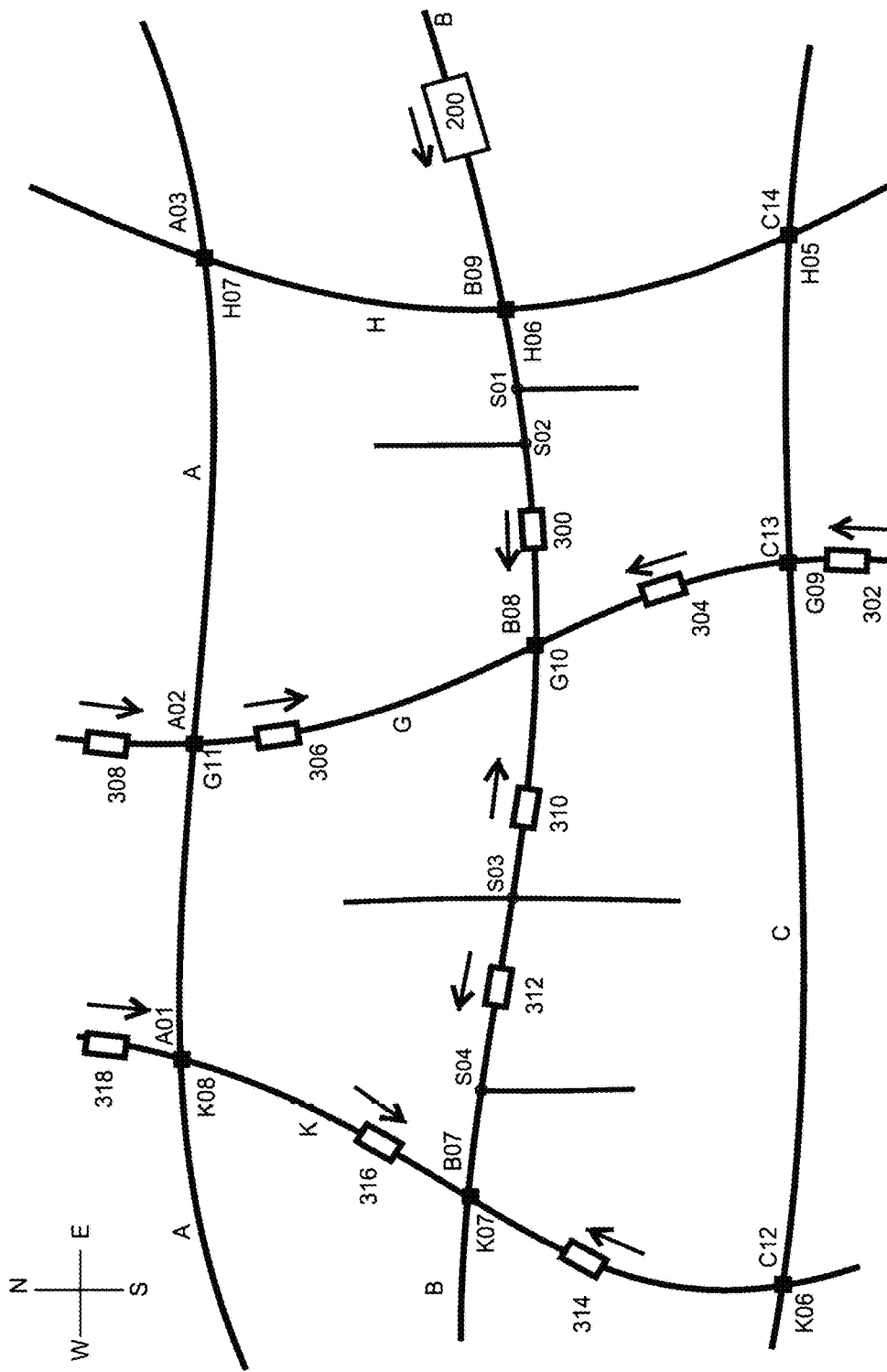
FIG. 24 Illustrates an example of the virtual preemption system of the present invention.

Laying street center-line track points to create street intersections leg-segments as shown in FIGS. 15, 20 and 23. Database of Latitude/Longitude of track points create a virtual trail for each leg-segment. The track points could be dropped as the center points of the intersections when the center lines of the segments between the intersections are straight lines.

When the center lines of the segments are curvy, a few extra points are dropped to represent the curvature of the segment. Triangulation uses the intersections' coordinates or the coordinates of two track points between them the vehicle is traveling and the vehicle's coordinates to verify the position of the vehicle inside a segment, as shown in FIG. 23 when a perpendicular distance 97 from the vehicle's location to the center line 95 of the segment exceeds half of the Calculation segment's width "a selected value", it means that the vehicle 96 is outside the segment. By using triangulation, we can reduce the amount of track points required to describe a segment since we convert the center line of the segment into a series of straight lines.

The vehicle's course along with the slope angle of the line 95 between the two track points can determine the deviation angle 99 between the vehicle's longitudinal axis 98 and the center line 95.

The vehicle unit V10 can be loaded with database of track points, a small database of predefined Cases and a small database of images of actual road signs, enough to cover an entire country, state or quite few countries of interest. Also the owners of the vehicles may obtain the database in CD-ROM format and load them onto the V10 unit or they may use microSD memory cards that are preloaded with the database that can easily be added, or obtain the database by other means.

The green light allows traffic to proceed, the yellow light indicates prepare to stop short of the intersection, and the red light prohibits any traffic from proceeding.

Flashing red should be treated as a stop sign and also can signal the road is closed. Flashing yellow should be treated as caution, crossing or road hazard ahead. Flashing green will vary among jurisdiction; it can give permission to go straight as well as make a left turn in front of opposing traffic "which is held by a steady red light", can indicate the end of a green cycle before the light changes to a solid yellow, or "as in some countries indicates the intersection is a pedestrian crosswalk".

Traffic signal timing is used to determine which approach has the right-of-way at San intersection, and how much green time the traffic light shall provide at an intersection approach, how long the yellow interval, how long the red light and how long green turning light, should be, and how long the pedestrian "walk" signal should be.

The GPS receiver module 28 "or any other in-vehicle positioning receivers" in the vehicle unit V10 enables the vehicle unit to determine its coordinates, speed, heading and date/time at real-time status, by matching and comparing the GPS coordinates of the vehicle to the Latitude/Longitude data of track points in the database, the unit V10 can determine the exact leg segment. As shown in FIG. 20, the segment could be a section of a road between two consecutive road intersections, or it could be an intersection leg of a length lies between 0.1 mile and 0.5 mile depending on the speed limit of the road. Generally, each leg segment is identified by its road-name and a serial number or identified by a code. Occasionally, some cities may have similar road names; therefore the database uses special codes similar to the zip codes to identify different cities or geographic sections. The road names could be coded to eliminate any chance of having a repeated name for different roads inside the same geographic section.

The leg segment along with the vehicle's course and a segment orientation which is either vertical or horizontal triggers a respective part of a Case Model's programming code. And the vehicle's LCD displays the signal shapes "squares or image icons for example". As shown in FIGS. 2-5.

The big red 34 or big yellow light shape (not shown) only appears on the screen when the vehicle is less than 350 meters away from a predefined intersection to indicate the location of this intersection during a yellow or red signal phase, the big red represents the red light signal when the vehicle is less than 350 meters away from the intersection, the big yellow represents the yellow light signal when the vehicle is less than 350 meters away from the intersection, and when the vehicle is less than 200 meters away from the intersection during a yellow or red signal phase, an audio alert starts beeping to indicate the location of this intersection. Also, distinctive colored marks painted on the pavement of the intersection or a distinctive actual road sign at the intersection can indicate a predefined intersection to enhance the awareness of drivers approaching this intersections, the 350 and 200 meters were confirmed by the field experiments.

Conventional Use of Traffic Volume

Traffic volume is an important basis for determining what improvements, if any, are required on a highway or street facility. Traffic volumes may be expressed in terms of average daily traffic or design hourly volumes. These volumes may be used to calculate the service flow rate, which is typically used for evaluations of geometric design alternatives.

The Federal Highway Administration's (FHWA's), Office of Highway Policy Information has traditionally maintained national programs to track traffic trends. Traffic Volume Trends is a monthly report based on hourly traffic count data reported by the States. These data are collected at approximately 4,000 continuous traffic counting locations nationwide and are used to estimate the percent change in traffic for the current month compared with the same month in the previous year. Estimates are re-adjusted annually to match the vehicle miles of travel from the Highway Performance Monitoring System and are continually updated with additional data.

The process of building the in-vehicle database of the present invention

The present invention uses the traffic volume data which are collected via different means of counting traffic volume in each direction of the road and convert them into volume size code, for instance, H represents high volume, M represents medium volume, L represents low volume, and XL represents extremely low volume, B represents both directions, N represents northbound direction, S represents southbound direction, E represents eastbound direction and W represents westbound direction.

For instance, The code 1HS will refer to a vertical road section with high traffic volume southbound and lesser traffic volume northbound, also, the code 1HN will refer to a vertical road section with high traffic volume northbound and lesser traffic volume southbound. Similarly, the code 2ME will refer to a horizontal road section with medium traffic volume eastbound and lesser traffic volume westbound, the code 2LB will refer to a horizontal road section with low traffic volume in both directions.

The present invention uses a database processing software (the processing software is not installed in vehicles, it is only used for building the database which will be in-vehicle database), this software is being coupled to a GPS digital map (a processing map) to generate the center points coordinates of the intersections and the track points coordinates and to assign a predefined Case to each predefined intersection on the processing map based on the traffic volume size code of each leg of the intersection, in this map roads are coded by the volume size codes to indicate the size of traffic in each leg segment of intersections. Moreover, any road in this map is coded by different volume size codes for busy traffic hours period, medium traffic hours period and low traffic hours period to represent the change of traffic volumes during the hours of the day to mimic the actual traffic light performance.

Note: predefined intersections refer to road intersections equipped with traffic signals and other equipment or the intended signaled intersections, "the main objective of the present invention is to replace the equipment at these intersections by the autonomous in-vehicle virtual traffic light system".

SQL (Structured Query Language) as an example of a database is a computer language aimed to store, manipulate, and query data stored in relational databases. In a relational database, data is stored in tables. A table is made up of rows and columns. Each row represents one piece of data, and each column can be thought of as representing a component of that piece of data. For example, if we have a table for tracking points information, then the columns may include information such as Latitude, Longitude, and Street names or Segment IDs as shown in FIG. 15. As a result, when we specify a table, we include the column headers and the type of data for each column. We may also decide to place certain limitations, or constraints, to guarantee that the data stored in the table makes sense.

The latitude and longitude coordinates are in decimal degrees for database and programming use. Typical consumer-grade GPS units (e.g. Garmin GPS Map 76C) will deliver 1-3 m accuracy. For that grade of GPS, reporting 5 decimal places will preserve a precision of 1.1 m accuracy.

An example:
Latitude N 41° 5' 3.588"=41.08432976612652°
Longitude W 81° 30' 51.4938"=−81.51430423111378°

For reporting 5 decimal places the Latitude will be 41.08432 and the Longitude will be −81.51430. For programming purposes and database design, the Latitude and the Longitude values will be used as:
Latitude 41.08432, LatA=41.0
Longitude −81.51430, LonA=−81.5

FIG. 14 shows SQL table. In that table a city or a region is divided into a number of geographic sections each section is about 8-20 by 8-20 miles, and identified by its LatA and LonA.

Additionally, one or more table could represent one or more city or geographic section.

The table Section_Location is comprises three columns, the 1st column for LatA, 2nd column for LonA and the last column for location ID. For example, the position Latitude 41.07629, Longitude −81.52229 has LatA=41.0 and LonA=−81.5, by applying the SELECT SQL command for Location ID, WHERE LatA=41.0 AND LonA=−81.5, the result will be 44308.

44308 is the actual zip code for downtown the city of Akron, Ohio where the Latitude 41.07629, Longitude −81.52229 of this position belong.

Distance Between the Vehicle and an Intersection in Meters
Latitude of the vehicle−Latitude of the intersection=Y
Longitude of the vehicle−Longitude of the intersection=X
Distance=10.112√{square root over (X*X+Y*Y)}

Naming and Coding Streets

For streets located inside a geographic area inside the processing map which is coupled to the processing software:

For the purpose of creating the database elements required to run the in-vehicle traffic light system autonomously inside the vehicle we must follow the following rules to allow the in-vehicle software "programming code" to calculate and predict the following mathematic steps:

A street can take a single or more alphabet letter (or other type of coding) to define it or to define a section of a street as shown in FIGS. 9-13.

Two streets or sections must not have the same name "code" inside the same geographic section.

A street or a section of street has to be defined as horizontal or vertical, for instance, code 2 for horizontal orientation, code 1 for vertical orientation.

A geographic section can be an area of 8-20 miles by 8-20 miles for example, as shown in FIG. 14.

Coding Intersections

Intersections on certain streets must follow the following rules:

For horizontal streets, numbering ascending eastbound as shown in FIG. 10, for vertical streets, numbering ascending northbound for example as shown in FIG. 11.

Ascending eastbound for numbering the intersections on a horizontal road makes the in-vehicle software to calculate and predict the following consecutive intersections from the database after determining a first intersection on that road.

Similarly, ascending northbound for numbering the intersections on a vertical road makes the in-vehicle software to calculate and predict the following consecutive intersections from the database after determining a first intersection on that road too, to be used extensively in the virtual preemption system.

Note: ascending or descending numbering of the intersections could be done in many ways as soon as the in-vehicle software can predict the upcoming intersections the vehicle is approaching based on the vehicle's heading and the orientation of the segment.

Figures 12, 13:
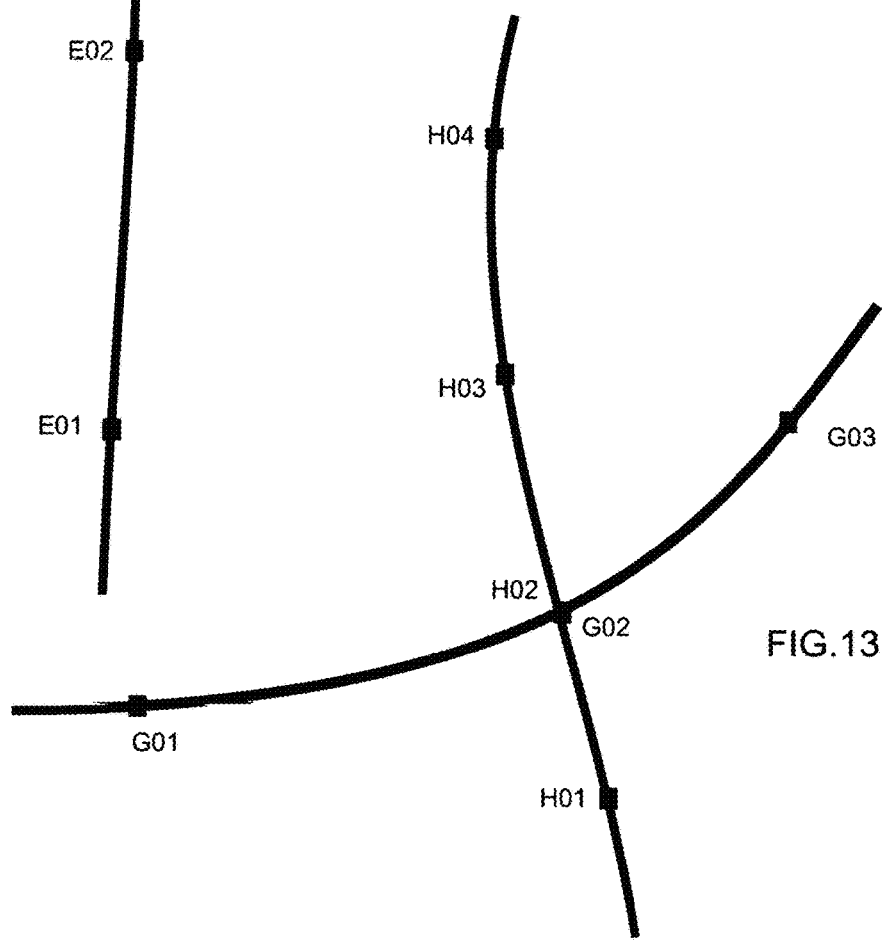
FIG. 12 Illustrates an example of numbering the intersections on a horizontal street coded F intersects with a vertical street coded E.
FIG. 13 Illustrates an example of numbering the intersections on a horizontal street coded G intersects with a vertical street coded H.

When two streets intersect, the intersection must have a different code for each street as shown in FIG. 12 and FIG. 13.

Intersection F01 belongs to street F and intersection E03 belongs to street E, intersection F01 and E03 has the same latitude/longitude and the same traffic Case and the same threshold delay time "which is disclosed with great details in the following paragraphs", basically, intersection F01 and E03 are the same intersection.

When two streets join to form one street, the joint intersection must have a different code for each street as shown in FIG. 9. Intersection C01 belongs to street C and intersection D01 belongs to street D. Intersection C01 and D01 has the same latitude/! longitude.

The intersection is defined by its street code and its number "the intersection code is the intersection identification" as shown in FIG. 10, the street code is A and the intersections are A01, A02, A03, A04 and A05. For FIG. 11, the street code is B and the intersections are B09, B10 and B11.

In the processing map, each predefined intersection is marked and coded and each leg segment is coded by at least one volume size code and an orientation code which is either vertical or horizontal, the center points of predefined intersections and track drop points are marked to extract the latitude/longitude coordinates associated with these intersections and associated with these track points from the map, the processing software is arranging the leg segment identification based on the segment orientation code and the two intersections codes of this segment, the processing software also arranging the intersection identification, the latitude/longitude coordinates of their centers, the selected predefined Cases, and the threshold delay times for the predefined Cases. A predefined Case stored in the database as green and turning arrow times for just one segment for each road orientation "as the most preferred embodiment".

Note: the two-road intersection only has one vertical orientation and one horizontal orientation, the three-road intersection has three road orientations.

Note: the red time is calculated and determined by the in-vehicle software based on the Case's times and the Case Model's programming code associated with this Case, the yellow time is a selected value such as 6 or 7 seconds. Similarly, in case of storing the Case as red and turning arrow times, the in-vehicle software can calculate the green times.

Traveling between two consecutive intersections on a same street can determine the in-vehicle Cases at the upcoming intersections consecutively, also can determine the coordinates of these intersections. The joined streets are considered a same street for the emergency vehicle virtual preemption system.

When making a right or left turn at an intersection of two or more streets, traveling between two consecutive intersections on the new street can determine the Cases at the upcoming intersections consecutively on the new street, also can determine the coordinates of these intersections.

For the database, there is a first table to locate the geographic section 79 based on the Latitude/Longitude of the traveling vehicle as shown in FIG. 14. A second table to locate the segment identification and then the in-vehicle software extracts the intersection identifications from the segment identification, wherein the vehicle is traveling between these two intersections based on the Latitude/Longitude of the traveling vehicle as shown in FIG. 15, a third table to determine the in-vehicle traffic Case IDs, the threshold delay time for the Cases for the upcoming intersections and their Latitude/Longitude based on, the intersection ID, the heading of the vehicle and the segment orientation as shown in FIG. 16. And a fourth table to provide the time phases for a Case as shown in FIG. 17.

Conventional Traffic Controller

A traffic signal is typically controlled by a controller inside a cabinet mounted on a concrete pad. Some electromechanical controllers are still in use. However, modem traffic controllers are solid state. The cabinet typically contains a power panel, to distribute electrical power in the cabinet; a detector interface panel, to connect to loop detectors and other detectors; detector amplifiers; the controller itself; a conflict monitor unit; flash transfer relays; a police panel, to allow the police to disable the signal; and other components.

Phases and Stages

Traffic controllers use the concept of phases, which are directions of movement grouped together. For instance, a simple crossroads may have four vehicle movement phases: North, East, West and South. There may be additional phases for pedestrian movements as well.

A stage is a group of phases which run at the same time. A simple crossroads may have two stages: North and South, and West and East. It is important that phases in a stage do not conflict with each other.

The in-vehicle virtual traffic controller "Case Models" of the present invention A Case Model is a block of a programming code which is part of the in-vehicle software, a Case Model runs an entire intersection in all directions with a manner similar to the actual traffic controller, wherein all Stages "groups of phases" of an intersection do not conflict with each other when they run at the same time.

In the present invention; each leg segment is represented by a respective stage inside a Case Model based on the segment orientation and the heading of the vehicle, since the leg segment could be a vertical segment and the vehicle's heading could be either northbound or southbound, or the leg segment could be a horizontal segment and the vehicle's heading could be either eastbound or westbound.

Additionally, the Case Model is acting as a mathematic relationship to coordinate all the stages of an intersection, and each segment orientation and direction of movement approaching the intersection activates its respective part of the Case Model's programming code, therefore the Case Model is a virtual traffic controller.

Depending on the size of traffic in each segment and the heading of vehicles during the different hours of the day we can generate as many Cases that run on a number of Case Models to be assigned for predefined intersections by the processing software. A single intersection could be assigned more than one Case to represent the change of traffic size during the hours of the day from low to high or high to medium for example.

Another objective in designing the Case Models and the Cases' times of the present invention is to mimic the dynamic control of traffic at an intersection (actuated control system in which the fixed time light cycle mimics the average time of the actuated traffic light cycle for each leg segment for each direction at intersections based on the traffic volume history of the roads).

Coordinated Control

Attempts are often made to place traffic signals on a coordinated system so that drivers encounter a green wave, a long string of green lights (the technical term is progression).

Traffic lights must be instructed when to change stage and they are usually coordinated so that the stage changes occur in some relationship to other nearby intersections or to the press of a pedestrian button or to the action of a timer or a number of other inputs.

In modern coordinated signal systems, it is possible for drivers to travel long distances without encountering a red light.

Therefore, the purpose of the "threshold delay time" for the Cases of the present invention is to create Coordinated control to allow progression so that the stage changes occur in some relationship to other nearby intersections which are assigned a number of Cases by manipulating the beginning time of each Case at nearby intersections.

Generally, the present invention created at least 10 Case Models to cover every possible scenario of road intersections from Stop Sign and Caution to heavy traffic, a number of predefined Cases run on each Case Model. Around 60 predefined Cases run on these few Case Models can cover almost all intersection scenarios. As being previously described, the Case holds the values of green and arrow turning times for just one segment per each orientation. The predefined Cases database is accessed by the processing software to assign the proper Case to the target intersection.

The Case Model basically represent the traffic size in each segment of the intersection, for instance as the following:
Some Case Models without times:
 A Case Model for stop sign at each segment (4-way stop).
 Another Case Model for flashing yellow/flashing red for vertical segments (continuous green traffic signal in the heavy traffic road).
 Another Case Model for flashing yellow/flashing red for horizontal segments.

There is also a Case Model (Case Model 1) for a simple intersection (under medium traffic in all segments) without left turning signal.

Another Case Model (Case Model 2) for heavy traffic in all segments of the intersection or in just one road of the intersection (in which, the left turning signal activates during the red light phase of a same segment).

And other four Case Models (Case Models 3, 4, 5 and 6), in these four Case Models the traffic size in one segment of a specific orientation is bigger than the traffic size in the other segment of the same orientation.

Figure 21:
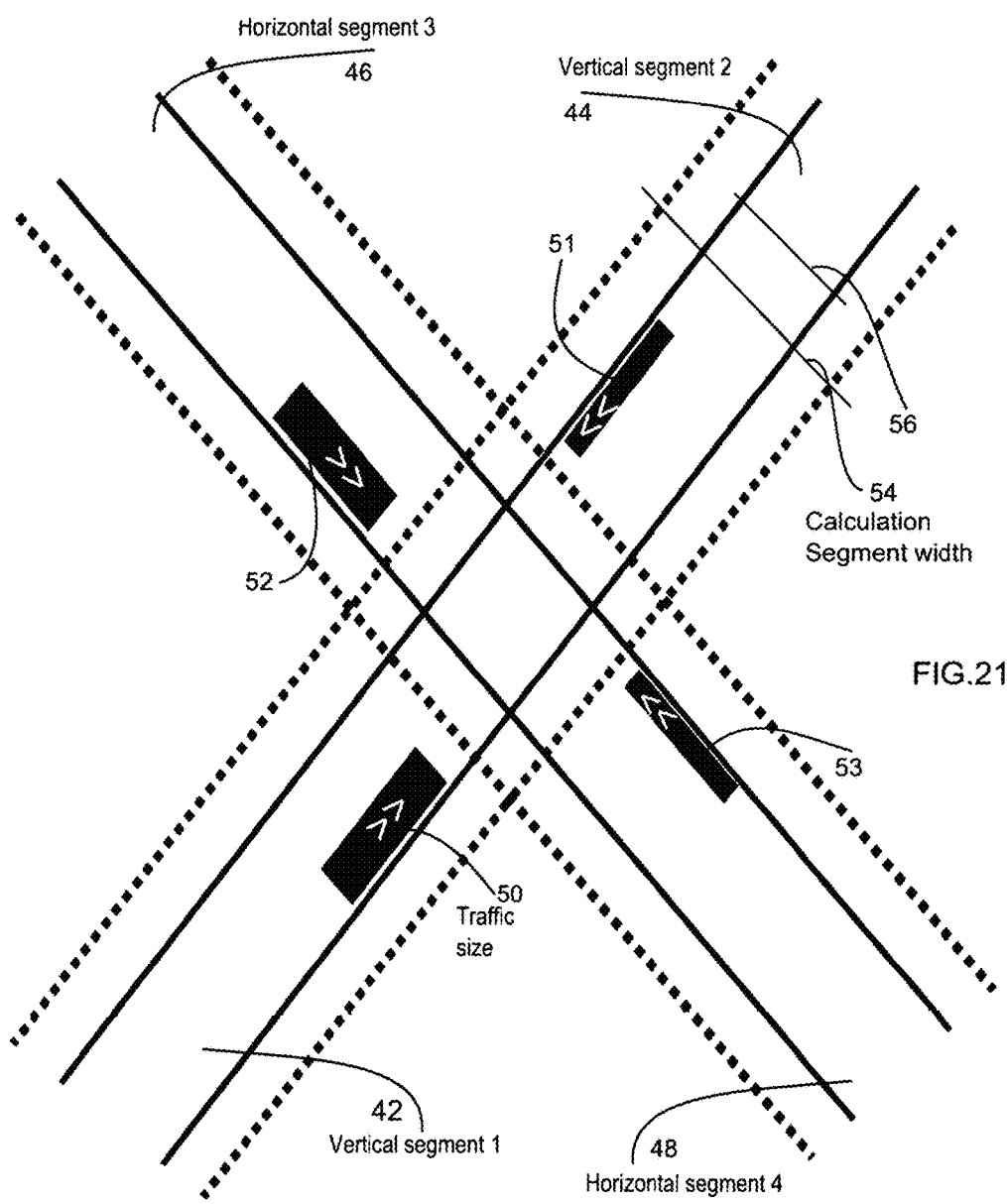
FIG. 21 Illustrates an example of a Case Model at an intersection.

FIG. 21 shows an example of a Case of a Case Model 3 type runs on Case Model 3 at an intersection, providing different values for green and arrow times, the processing software can create at least 6 different Cases run on this Model, manipulating the green and the arrow times are calculated based on the traffic volumes during the hours of the day to represent busy traffic, medium traffic and low traffic, these 6 Cases of a Case Model 3 type hold the manipulated times as preset values.

The times values include;
 Green signal time selected for segment 1 of vertical orientation.
 Note: traffic size in segment 1 is bigger than traffic size in segment 2 which is also of vertical orientation.
 Green signal time selected for segment 3 of horizontal orientation.
 Note: traffic size in segment 3 is bigger than traffic size in segment 4 which is also of horizontal orientation.
 The left turning signal time selected for segment 1.
 The left turning signal time selected for segment 3.

FIG. 17 shows an example for different times values for a number of Cases run on the Case Models 3, 4, 5 and 6, for instance Case 30 of Case Model 3 type has times values equal to 90 80 20 20.
 The first 2 digits 90 are the green time in seconds for segment 1.
 The next 2 digits 80 are the green time in seconds for segment 3.
 The next 2 digits 20 are the left turning time in seconds for segment 1.
 The next 2 digits 20 are the left turning time in seconds for segment 3.

The intersection of FIG. 21 has four leg segments, (segment 1) 42 is a vertical segment and its traffic volume 50 approaching the intersection is higher than the traffic volume 51 in (segment 2) 44 which is also a vertical segment. Thus, (the group of phases in segment 1) start the traffic phases (its respective part of the Case Model 3 assigned to the four legs) with green signal (straight) and left turn green signal arrow for a period of time equal to the left turning time (assigned to segment 1 by the Case), while (the group of phases in segment 2) start the traffic phases with red signal for a period of time equal to the left turning time of segment 1 plus 2 seconds for red clearance. After that, both of segment 1 and segment 2 have green signal (straight) for the remaining time of the whole green signal time of segment 1 assigned by the Case, then followed by synchronized 7 seconds of yellow signal in both segment 1 and segment 2, then followed by synchronized red signal in both segment 1 and segment 2 equal to (the whole green signal time of segment 3 assigned by the Case plus 7 seconds of yellow time plus 4 seconds for red signal clearance). For the horizontal (segment 3) 46 which has more approaching traffic 52 than the horizontal (segment 4) 48 of traffic 53, both of segments 3 and 4 start their phases by synchronized red signal equal to (the whole green signal time of segment 1 assigned by the Case plus 7 seconds of yellow time plus 2 seconds for red signal clearance, then followed by green signal (straight) and left turn green signal arrow for a period of time equal to the left turning time (assigned to segment 3 by the Case) for segment 3. While followed by red signal for a period of time equal to the left turning time of segment 3 plus 2 seconds for red clearance for segment 4. Then followed by synchronized green signal (straight) in both segment 3 and segment 4 for the remaining time of the whole green signal time of segment 3 assigned by the Case. Then followed by synchronized 7 seconds of yellow signal in both segment 3 and segment 4. Then followed by synchronized 2 seconds of red signal in both segment 3 and segment 4 for all red clearance.

Note: For orientation code=1:
course=the GPS receiver module's course in degrees.
 northbound=(course<89 OR course>271)
 southbound=(course<269 AND course>91)
For orientation code=2:
 eastbound=(course<179 AND course>1)
 westbound=(course<359 AND course>181)
An example of Case Model 3 programming code block:
 DISS=the calculated distance between the vehicle and the upcoming intersection based on the Latitude/Longitude of the vehicle and the Latitude/Longitude of the intersection center.
Converting the current time into seconds:
 a=hour*3600 sec
 b=minute*60 sec
 c=second sec Total Time In Seconds=T Time=a+b+c
GRT1=green time assigned for segment 1
GRT3=green time assigned for segment 3
LAT1=the left turning time assigned for segment 1 (the last 5 seconds of it for yellow turning arrow)
LAT3=the left turning time assigned for segment 3 (the last 5 seconds of it for yellow turning arrow)
YLT=yellow time phase for all stages=7 seconds
CYT=The Cycle Time=GRT1+2*YLT+GRT3+4
DCY=threshold delay time in seconds for this Case.
number of repeated cycles=(T Time-DCY)/CYT
TTFC=the total time of full cycles=CYT*whole number of repeated cycles
pass Time=passed time from last cycle=(T Time-DCY-TTFC)
DIR=1 for vertical segment 1 or vertical segment 2 "the orientation code of segment 1 or 2"
DIR=2 for horizontal segment 3 or horizontal segment 4 "the orientation code of segment 3 or 4"
course=the GPS receiver module's course in degrees.
For orientation code=1:
  north=(course<89 OR course>271)
  south=(course<269 AND course>91)
For orientation code=2:
  east=(course<179 AND course>1)
  west=(course<359 AND course>181)
for Index in 0 . . . 1000 {
if((0<=passTime&&passTime<GRT1) &&north&&DIR==1) {show green light inside segment 1}
if (GRT1<=passTime && passTime<GRT1+YLT && north && DIR==1) (show yellow light inside segment 1)
if (GRT1<=passTime && passTime<GRT1+YLT && north && DIR==1 && DISS<350) {show big yellow light inside segment 1}
if (GRT1<=passTime && passTime<GRT1+YLT && north && DIR==1 && DISS<200 && DISS>100) {start the audio alert inside segment 1}
if ((GRT1+YLT)<=passTime && passTime<=(GRT1+2*YLT+GRT3+4) && north && DIR==1) {show red light inside segment 1}
if ((GRT1+YLT)<=passTime && passTime<=(GRT1+2*YLT+GRT3+4) && north && DIR==1 && DISS<350) {show big red light inside segment 1}
if((GRT1+YLT)<=passTime && passTime<=(GRT1+2*YLT+GRT3+4) && north && DIR==1 && DISS<200 && DISS>100) {start the audio alert inside segment 1}
if(0<=passTime &&passTime<=LAT1-5 &&north&&DIR==1 &&DISS<350) {show the green turning light arrow inside segment 1}
if(LAT1-5<passTime &&passTime<=LAT1 &&north&&DIR==1 &&DISS<350) {show the yellow turning light arrow inside segment 1}
if(LAT1<passTime && passTime<GRT1 && south && DIR==1){show the green light inside segment 2}
if(GRT1<=passTime && passTime<GRT1+YLT && south && DIR==1) {show the yellow light inside segment 2}
if (GRT1<=passTime && passTime<GRT1+YLT && south && DIR==1 && DISS<350) {show the big yellow light inside segment 2}
if(GRT1<=passTime && passTime<GRT1+YLT && south && DIR==1 && DISS<200 && DISS>100) {start the audio alert inside segment 2}
if(0<=passTime && passTime<=LAT1 && south && DIR==1) {show the red light inside segment 2}
if(0<=passTime && passTime<=LAT1 && south && DIR==1 && DISS<350) {show the big red light inside segment 2}
if(0<=passTime && passTime<=LAT1 && south && DIR==1 && DISS<200 && DISS>100) {start the audio alert inside segment 2}
if (GRT1+YLT<=passTime && passTime<=(GRT1+2*YLT+GRT3+4) && south && DIR==1) {show the red light inside segment 2 for stage 2}
if(GRT1+YLT<=passTime && passTime<=(GRT1+2*YLT+GRT3+4) && south && DIR==1 && DISS<350) {show the big red light inside segment 2}
if(GRT1+YLT<=passTime && passTime<=(GRT1+2*YLT+GRT3+4) && south && DIR==1 && DISS<200 && DISS>100) {start the audio alert inside segment 2}
if(0<=passTime&&passTime<(GRT1+YLT+2) &&east&&DIR==2) {show the red light inside segment 3}
if (0<=passTime && passTime<(GRT1+YLT+2) && east && DIR==2 && DISS<350) {show the big red light inside segment 3}
if(0<=passTime && passTime<(GRT1+YLT+2) && east && DIR==2 && DISS<200 && DISS>100) {start the audio alert inside segment 3}
if ((GRT1+YLT+2)<=passTime && passTime<(GRT1+GRT3+YLT+2) && east && DIR==2) {show the green light inside segment 3}
if ((GRT1+YLT+2)<=passTime && passTime<=(GRT1+YLT+LAT3-3) && east && DIR==2 && DISS<350) {show the green turning light arrow inside segment 3}
if ((GRT1+YLT+LAT3-3)<passTime && passTime<=(GRT1+YLT+LAT3+2) && east && DIR==2 && DISS<350) {show the yellow turning light arrow inside segment 3}
if ((GRT1+GRT3+YLT+2)<=passTime && passTime<(GRT1+YLT+GRT3+YLT+2) && east && DIR==2) {show the yellow light inside segment 3}
if ((GRT1+GRT3+YLT+2)<=passTime && passTime<(GRT1+YLT+GRT3+YLT+2) && east && DIR==2 && DISS<350) {show the big yellow light inside segment 3}
if((GRT1+GRT3+YLT+2)<=passTime && passTime<(GRT1+YLT+GRT3+YLT+2) && east && DIR==2 && DISS<200 && DISS>100) {start the audio alert inside segment 3}
if (GRT1+YLT+GRT3+YLT+2<=passTime && passTime<=(GRT1+YLT+GRT3+YLT+4)&&east&&DIR==2) {show the red light inside segment 3}
if (GRT1+YLT+GRT3+YLT+2<=passTime && passTime<=(GRT1+YLT+GRT3+YLT+4) &&east&&DIR==2&&DISS<350) {show the big red light inside segment 3}
if (GRT1+YLT+GRT3+YLT+2<=passTime && passTime<=(GRT1+YLT+GRT3+YLT+4) &&east&&DIR==2&&DISS<200 &&DISS>100) {start the audio alert inside segment 3}
if(0<=passTime&&passTime<(GRT1+YLT+LAT3+4) &&west&&DIR==2) {show the red light inside segment 4}
if(0<=passTime&&passTime<(GRT1+YLT+LAT3+4) &&west&&DIR==2&& DISS<350) {show the big red light inside segment 4}
if(0<=passTime&&passTime<(GRT1+YLT+LAT3+4) &&west&&DIR==2&& DISS<200 && DISS>100) {start the audio alert inside segment 4}
if((GRT1+YLT+4+LAT3)<=passTime&&passTime<(GRT1+GRT3+YLT+2) && west && DIR==2) {show the green light inside segment 4}
if ((GRT1+GRT3+YLT+2)<=passTime && passTime<(GRT1+YLT+GRT3+YLT+2) && west && DIR==2) {show the yellow light inside segment 4} if ((GRT1+GRT3+YLT+2)<=passTime && passTime<(GRT1+YLT+GRT3+YLT+2) && west && DIR==2 && DISS<350) {show the big yellow light inside segment 4}
if ((GRT1+GRT3+YLT+2)<=passTime && passTime<(GRT1+YLT+GRT3+YLT+2)&&west&&DIR==2
&&DISS<200 &&DISS>100){start the audio alert inside segment 4}
if (GRT1+YLT+GRT3+YLT+2<=passTime && passTime<(GRT1+YLT+GRT3+YLT+4)&&west&&DIR==2){show the red light inside segment4}
if (GRT1+YLT+GRT3+YLT+2<=passTime && passTime<(GRT1+YLT+GRT3+YLT+4)
&&west&&DIR==2&&DISS<350){show the big red light inside segment 4}
if(GRT1+YLT+GRT3+YLT+2<=passTime && passTime<(GRT1+YLT+GRT3+YLT+4) && west && DIR==2 && DISS<200 && DISS>100){start the audio alert inside segment 4}
}.

The other three Case Models (4, 5, 6) similar to the previous Case Mode 3 cover alternative scenarios when the traffic size in segment 2 is bigger than the traffic size in segment 1 and the traffic size in segment 3 is bigger than the traffic size in segment 4, also when the traffic size in segment 2 is bigger than the traffic size in segment 1 and the traffic size in segment 4 is bigger than the traffic size in segment 3, also when the traffic size in segment 1 is bigger than the traffic size in segment 2 and the traffic size in segment 4 is bigger than the traffic size in segment 3.

In the above four Case Models the left turning signal activates during the green signal phase of same segment.

FIGS. 18 and 19 show an example of multi-leg Case Model (Case Model 7) for multi-leg intersection, in this Case Model each leg is coded to activate specific part of the multi-leg Case Model (the left turning signal activates during the red light phase of same segment).

In the 6-leg intersection of FIG. 18, the street BRI intersects with both LAN and WOD streets, and the street LAN intersects with both BRI and WOD streets, the intersections BRI19, LAN15 and WOD22 are the same intersection with the same coordinates and assigned the same Case. For instance, the two leg segments on BRI street are vertical, the two leg segments on LAN street are horizontal, and the two leg segments on WOD street are horizontal too.

The first leg on BRI street takes order 1, 2nd leg on LAN street takes order 2, 3rd leg on WOD street takes order 3, 4th leg on BRI street takes order 4, 5th leg on LAN street takes order 5 and the last leg on WOD street takes order 6.

The legs assigned Cases 70 71 72, of Case Model 7 type, Case 70 for the heavy size hours period, Case 71 for medium size hours period and finally Case 72 for low size hours period, each leg triggers its respective part of the Case Model's code based on its order and based on a Case ID associated with each time period.

Note: there is a few seconds of yellow interval signal such as 6 seconds plus 2 or 3 seconds of all way red signal clearance, as a smooth transition from one Case to another at a same intersection when the Case of busy or medium or low traffic hours period flips to a different Case of a different traffic hours period, where a signal phase in a segment of this intersection has green signal in the Case before flipping to a new Case in which the same segment has red phase signal.

In another embodiment of coding the 3-road intersection:
The two segments of BRI street take the segment orientation code 1 for northbound and southbound heading.
The two segments of LAN street take the segment orientation code 2 for eastbound and westbound heading.
The two segments of WOD street take the segment orientation code 3 for eastbound and westbound heading.

In this scenario each leg segment triggers its respective part of the Case Model's code based on its orientation code and the heading of the vehicle.

The following is an example of how to represent traffic changes during a 24 hour day:
high traffic period=(7<=hour AND hour<10) OR (14<=hour AND hour<17)
medium traffic period=(10<=hour AND hour<14) OR (17<=hour AND hour<21)
low traffic period=(21<=hour AND hour<=24) OR (0<=hour AND hour<7)

FIG. 19 shows an example of few Cases of Case Model 7 type run on Case Model 7, Case 70 has times 60 50 45 20 20 20.

Green signal time in segment 1 is 60 seconds, green signal time in segment 3 is 50 seconds, green signal time in segment 5 is 45 seconds.

Left turning arrow times in segment 1, segment 3, or segment 5 is 20 seconds, segments 1 and 2 have same stage (they run same phases at the same time), segments 3 and 4 have same stage and segments 5 and 6 have same stage.

In one Case of flashing yellow/flashing red which runs on Case Model flashing yellow/flashing red, the flashing red is displayed as flashing red only or as flashing red followed by stop sign image, while flashing yellow is not displayed in case of flashing yellow/flashing red represents a Case of a heavy traffic in one road intersects with another road of extremely low traffic (as commonly seen in side streets with stop sign intersect with a heavy traffic road).

FIG. 20 and FIG. 15 show the relation between the intersections WIL 13 of coordinates 80 and WIL 14 of coordinates 82 and the horizontal segment 2WIL1314 between them, because the segment center line is a straight line between the point 80 and the point 82, the two points 80 and 82 are sufficient enough to represent the segment 2WIL1314 when using triangulation to check if a vehicle traveling between them is not outside the segment.

The intersections BRO20 of coordinates 86 and BRO21 of coordinates 82 have no one-straight line to connect between the two intersections, therefore the point Pt1 of coordinates 84 is dropped to represent the curvature of the vertical segment 1BRO2021. Thus, the segment 1BRO2021 is repeated twice, once between point 82 and point 84, the 2nd time between point 84 and point 86. Similarly for intersections HIG10 of coordinates 94 and HIG11 of coordinates 88 have no one-straight line to connect between the two intersections, therefore the point Pt2 of coordinates 92 and Pt3 of coordinates 90 are dropped to represent the curvature of the vertical segment 1HIG1011.

FIG. 16 shows the relation between intersection IDs of horizontal and vertical segments of same intersection and the assigned Cases. The intersection WIL 13 for horizontal segment 2WIL 1314 and intersection HIG11 for vertical segment 1HIG1011 have same coordinates and assigned Cases 10 10 02. It is very obvious that WIL 13 and HIG11 are the same intersection.

The first two digits 10 for Case 10 for busy hours traffic runs on Case Model 1, then next two digits 10 for Case 10 for medium traffic also runs on Case Model land then next two digits 02 for the Case 02 for low traffic, Case 02 represents a Case Model flashing yellow/flashing red at an intersection, Case 10 represents a Case Model for a simple intersection without left turning signal. In this example high traffic hours and medium traffic hours are assigned the same Case.

As being mentioned before, there are a few seconds of yellow interval light signal such as 6 seconds plus 2 or 3 seconds of all way red signal clearance, as a smooth transition from one Case to another at a same intersection when the Case of heavy or medium or low traffic hours period flips to a different Case of a different traffic hours period, wherein, when a signal phase in a segment of this intersection has green signal in the Case before flipping to a new Case in which the same segment has red phase signal.

The in-vehicle autonomous road sign images:

A database of track points similar to the database used for the leg segments is used to display road sign images for designated directions as shown in FIG. 22. Also, there are road sign images such as school zone signs 11 and the flashing yellow bar 38 as in FIG. 4 for designated days and time (the school sign along with the flashing yellow bar 38 appear only during certain hours inside the school days) along with audio beeping alert.

Additionally, depending on the traffic volume of the roads during the hours of the day, or depending on the seasons or road conditions, some of the road sign images are displayed to represent the change of traffic volume such as increasing the speed limits during the low traffic hours. Thus, the present road sign images system provide a method to display variable speed limits and alerting road sign images for designated seasons, days and hours based on weather condition history and traffic history of the roads.

FIG. 20 and FIG. 22 show a horizontal section of Wilbeth RD between the point of coordinates 80 and the point of coordinates 82 and the road sign image ID 2 10 11 12 13 between them for both eastbound and westbound headings.

For the Sign ID 2 10 11 12 13: the first digit 2 means the road sign images for horizontal section of road, the next two digits 10 means a road sign image number 10 "SPEED LIMIT 30" for example and next two digits 11 means road sign image number 11 "HIDDEN DRIVE" for example. The "SPEED LIMIT 30" and "HIDDEN DRIVE" road sign images appear on the LCD 40 when heading eastbound, and road sign images number 12 and 13 appear on the LCD 40 when heading westbound.

The above example explained that the road sign images are displayed with high clarity at every location between the point of coordinates 80 and the point of coordinates 82, whereas the actual road signs only as good when approached in close proximity until they are behind the vehicle, and this leads to install extra actual road signs, thus, the increasing costs.

Similarly, the road sign image ID 1 14 15 16 17 between the point of coordinates 82 and the point of coordinates 84 of a vertical section of Brown St, the first digit 1 means the road sign images for vertical section of road the next two digits 14 and next two digits 15 means road sign images number 14 and 15 appear on the LCD 40 when heading northbound, and road sign images number 16 and 17 appear on the LCD 40 when heading southbound.

The road sign images database holds few hundred images to cover all known road signs standardized by federal regulations, most notably in the Manual on Uniform Traffic Control Devices (MUTCD) and its companion volume the Standard Highway Signs (SHS). Also the Vienna Convention on Road Signs and Signals standards.

Note: stop sign image in the present invention is treated as part of the traffic Case Models since the stop sign could represent part of flashing yellow/flashing red Case assigned for (high or medium or low)/extremely-low traffic hours at an intersection which may be assigned different Cases during busy traffic hours.

Override the Segments:

When a vehicle approaching the intersection there is a big chance that the vehicle is in more than one segment at the same time because segments width interfere with one-another and also because the vehicle's course could fit the vertical and the horizontal segment at the same time, and since the present system uses Calculation width 54 (as a selected value) as seen in FIG. 21, this width 54 is always bigger than the actual width 56 to cover as much of a segment with fewer drop points regardless the actual width of the segments. Therefore, a timer and a distance counter are used to verify the exact segment the vehicle is traveling on to eliminate all the chances of interference, the more time and distance inside a segment the more likely to override other segments and to ignore them. Additionally, as shown in FIG. 23 the deviation angle 99 between the vehicle's longitudinal axis 98 and the center line of the leg segment 95 accurately verify the exact leg segment the vehicle 96 is traveling on since this deviation angle 99 is close to zero degrees when the vehicle's axis 98 is almost parallel to the center line 95 of the leg segment, therefore, the closer to zero degrees the deviation angle 99 is the more likely to override other segments which have bigger angles.

The same concept of timers, distance counters and the angles between the vehicle's longitudinal axis and the center line of road segments is used for displaying the images of road signs without interference caused by roads width.

Figure 5:
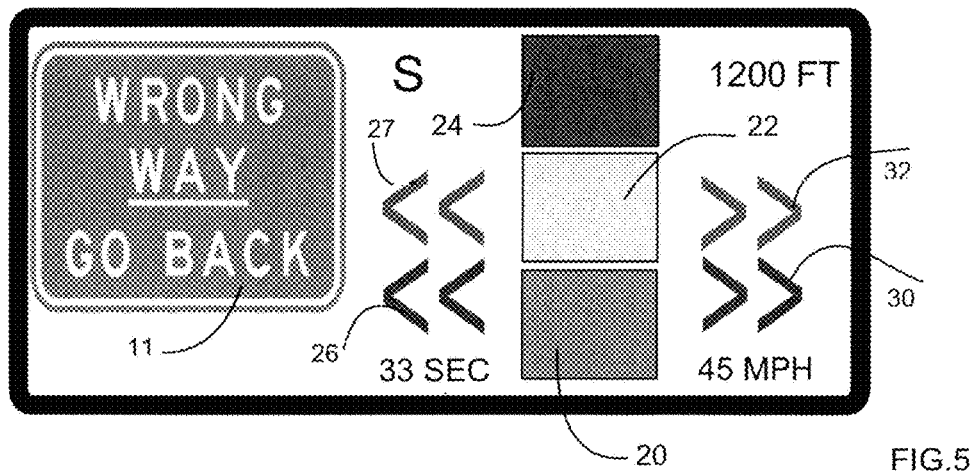

One-Way Roads:

In one way streets if a driver headed in the wrong direction of traffic, the LCD 40 displays a road sign image 11 "WRONG WAY" for example as shown in FIG. 5 along with the audio alert beeping to alert the driver to correct his heading.

To build the database of the latitude/longitude coordinates, the intersections leg segments, the Cases and threshold delay times, and database of road sign images. All together are the elements required to run the present in-vehicle traffic light system autonomously without relying on an external server or a broadcast station or a wireless network to provide traffic light information for vehicles.

Also without relying on a wireless communication between vehicles nor relying on wireless communication between traffic equipments at road intersections and vehicles to provide traffic light information for vehicles.

The database tables shown in FIG. 15 are designed to initiate the segment search to determine intersection IDs of two intersections the vehicle traveling between them based on the vehicle latitude/longitude, after that the vehicle can predict the upcoming intersection IDs based on the direction of traveling. Therefore, the vehicle knows the status of the traffic Case at each upcoming intersection ahead of time even before the vehicle reaches these intersections, and in case of a green signal phase for proceeding followed by a red light phase in the next approaching intersection the green LED indicator 61 may start blinking to warn the driver of the upcoming stop at the next intersection especially if the intersections are located in close proximity. Therefore, even there is a weak or no GPS signal for short time caused by tall buildings blocking the GPS satellite signals, the functionality of the system is not affected. Also by knowing the latitude/longitude of the upcoming intersections ahead of time, the vehicle can calculate the Safe Distance and the Stopping Distance ahead of time to be prepared for Running Red Lights avoidance.

Triggering conventional green traffic signal at heavy traffic roads

If you drive a car, bike, or motorcycle or as a pedestrian, chances are you regularly experience the frustration of waiting at red traffic lights that seem to take forever to change. Some actuated traffic lights are designed to keep heavy traffic traveling with green lights until they detect vehicles that arrive at a cross street and change accordingly.

Once a vehicle is detected by an inductive loop detector or camera detection, or a pedestrian initiates a traffic signal change using the available crosswalk buttons, the traffic light system is signaled that there is someone waiting to proceed. The lights for the cross traffic will then begin to change after a safe time period before the light turns green for you.

THUS, in order for the present in-vehicle autonomous virtual traffic light system to achieve the goal of replacing the conventional equipments at street intersections, the following methods are adopted by the present invention.

Triggering green traffic signal and turning traffic signal on a heavy traffic road are disclosed as the following:

As being disclosed with great details in the present system, the database tables shown in FIGS. 15-16 and 18 are designed to initiate the leg segment search to determine intersection IDs of two intersections the vehicle traveling between them based on the vehicle latitude/longitude, after that the vehicle can predict and extract the upcoming intersection ID from the segment ID based on the direction of movement. Therefore, the vehicle can determine the upcoming intersection coordinates, the intersection ID, the segment orientation, the traffic Case at the upcoming intersection, the vehicle's coordinates, and the heading, and the current date/time. The concept of actuated traffic signals designed to keep heavy traffic traveling with green signal until they detect a vehicle arrives at a cross street and change accordingly is adopted by the present system, especially since the vehicle unit V10 comprises a long range transceiver module. Therefore, when vehicles traveling on a heavy traffic street and approaching an intersection assigned the continuous green traffic Case (a Case runs on the flashing yellow/flashing red Case Model), they receive radio signal from a vehicle approaching this intersection from the cross street (low traffic street), this radio signal is carrying the intersection ID, the segment orientation of the low traffic street (the segment it travels on), a time at which the vehicle on the low traffic street activates the crossing request, this time is referred herein as (time stamp), also the signal is carrying the heading of the vehicle on the low traffic street and a code C (to represent crossing for example). All vehicles traveling on the heavy traffic street use these data to flip the green signal to few seconds of yellow signal (6 seconds for example) before flipping to red signal for 15 seconds to give access to all vehicles on the low traffic street to have 9 seconds of green signal plus 6 seconds of yellow signal, the 6 seconds plus the 15 seconds are referred herein as (the temporary cycle, this cycle contains 2 or 3 seconds of all way red clearance too), the vehicles on the heavy traffic street are periodically transmitting the same received data during the temporary cycle (until these vehicles exit this intersection) to other vehicles approaching this intersection to allow them to determine the remaining time of the temporary cycle. Additionally, bikes, motorcycles or pedestrians can apply the same method to trigger the green signal when sending the radio signal.

Note: When a vehicle moves from one leg segment to another of same intersection, this means that the vehicle exited this intersection.

Similarly, the same concept is used to provide turning signal for vehicles traveling on a heavy traffic street approaching an intersection assigned continuous green traffic Case, when a vehicle traveling on the heavy traffic street activates the turning request, it transmits a radio signal, this signal is carrying the intersection ID, the segment orientation of the heavy traffic street (the segment it moves on), the time stamp when the vehicle activates the turning request, the heading of the vehicle and a code T (to represent turning for example). All vehicles traveling on the heavy traffic street approaching this intersection use these data to check if they are in the opposite heading to flip to the temporary cycle to give access to vehicles traveling on the heavy traffic street with heading matching the heading of the vehicle that requested the turning access, the vehicles on the heavy traffic street with the opposite heading is periodically transmitting the same received data during the temporary cycle (until these vehicles exit this intersection) to other vehicles approaching this intersection to allow them to determine the remaining time of the temporary cycle.

The 4-Way Stop Common Rule:

When you approach a 4-way stop, whether it's at a traffic light or stop sign, it's important to slow down and come to a complete stop. You'll want to pay attention and take notice if there are any other vehicles stopped around you or any vehicles coming up to the 4-way stop.

It's important to make sure that you have come to a complete stop within the indicated lines on the road. You can move forward if you have trouble seeing, but only after you've come to a complete stop. Failing to do so could result in a traffic ticket.

Take a look around and see if there are any other vehicles at the 4-way stop. Of course, if you're the only vehicle at the stop, then you have the right of way and are free to go. Vehicles leave the stop sign or traffic light in the same order in which they arrived at the stop Therefore, if you arrive at a 4-way stop first, then you get to leave first. If you're the last person to arrive at the stop, then you will have to wait until the other three cars have moved on before you can do the same.

There are times when vehicles will arrive at a 4-way stop at the same time. Therefore, when this occurs, it's important to know which vehicle has the right of way. The car that is furthest to the right is allowed to go first. Though this is the appropriate and legal method, there are still motorist who don't always follow this rule. To avoid accidents, you may choose to wait a few seconds before moving forward. After all, just because it's technically you're turn to go, doesn't necessarily mean the other vehicles will allow you to do so.

The present system provides a new method to allow a vehicle to determine the right of way order at all-way stop intersections, specially since the vehicle unit V10 comprises a long range transceiver module. Therefore, as soon as a vehicle approaches an intersection assigned the all-way stop Case and is less than 200 meters (for example) away from this intersection as a threshold distance, it is periodically transmitting a same radio signal, this signal is carrying the intersection ID, the segment orientation of the segment it moves on, the heading of the vehicle, a time stamp and a code O (to represent the order of arriving at this intersection). Each vehicle approaching this intersection compares the time stamps of all vehicles including itself to determine the right of way order. The vehicle with the earliest arriving time displays blinking green traffic signal on its own LCD screen 40 to indicate the right of way while other vehicles display a stop sign image on their LCD screens. If more than one vehicle arrived at the same time, the system gives the northbound heading priority before eastbound, and the eastbound priority before southbound, and the southbound priority before westbound for example. After the vehicle exits the intersection, it stops transmitting the radio signal.

In another embodiment of the all-way stop intersection, vehicles traveling on a same segment in a same heading can be grouped together, in this case the vehicle with the earliest arriving time along with other vehicles on its same segment and its same heading display blinking green signal on their LCD screens while other vehicles display a stop sign image on their LCD screens.

Similarly, the concept of grouping vehicles traveling on a same segment and a same heading can be used in managing traffic circles by the present system (traffic circle is a type of intersection that directs both turning and through traffic onto a one-way circular roadway). In this case, the vehicle with the earliest arriving time along with other vehicles on its same segment and its same heading display a blinking green traffic signal on their LCD screens while other vehicles display a stop sign image on their LCD screens.

In another embodiment, as soon as a vehicle is less than 200 meters away from approaching an intersection assigned the Circle Case (or the all-way stop Case), it is periodically transmitting a same radio signal, this signal is carrying the intersection ID, the segment orientation of the segment it moves on, the heading of the vehicle, a time stamp and a code O (to represent the order of arriving at this intersection). Each vehicle approaching this intersection compares the time stamps and the number of vehicles in each segment, thus, the segment with the highest number of vehicles will get the right of way and display blinking green traffic signal on their LCD screens while other vehicles display a stop sign image on their LCD screens. Or if the number of vehicles in the segment of the highest number of vehicles is less than two or three vehicles (the minimum number of vehicles for example), then, the segment in which one vehicle has the earliest arrival time will get the right of way. Or if a vehicle has the earliest arrival time and exceeded the maximum waiting time (a few minutes for example) at the circle regardless the number of vehicles in each segment, then, it will get the right of way along with all vehicles in its own segment.

It is very obvious in the traffic circle case that vehicles with the right of way may not need to move in one way direction to exit the circle since all vehicles in all segments will access the circle one segment at a time.

It is very obvious too that making the vehicles to determine the right of way order at all-way stop intersections and at traffic circles will eliminate the discomfort and confusion most drivers feel, also it will reduce the waiting time.

It is very obvious too that the vehicle may not need to slow down or to fully stop when it arrives before other vehicles or when no other vehicles approaching the all-way stop intersection or the traffic circle.

It is very obvious too that autonomous vehicles may integrate the above all-way stop method for traffic circles and all-way stop intersections, wherein the vehicle can determine the right of way order automatically.

It is very obvious too that autonomous vehicles may integrate the above method for triggering green traffic signal and turning traffic signal on a heavy traffic road.

It is very obvious too that in other embodiments of indicating the in-vehicle traffic light signals and the in-vehicle road sings of the present invention, this indication could be via in-vehicle audible messages directed to the vehicle driver for cases such as motorcycles to enhance the safety of the driver while keeping his eyes on the road. Also, in other embodiments of indicating: the in-vehicle traffic signals, the in-vehicle road sings and the in-vehicle virtual preemption for both ordinary and emergency vehicles, this indication will be via in-vehicle computer codes directed to the vehicle computer system for cases such as autonomous vehicles. Note: when saying "the vehicle is calculating, determining, detecting, predicting, . . . etc." this term is referring herein to the vehicle unit V10 and the LCD 40 and the in-vehicle database and the in-vehicle software, specially when drafting the claims of present invention.

The Method on-Board Vehicles to Predict a Plurality of Primary Signs of Driving while Impaired or Driving while Distracted and Preventing Running Red Lights Automatic Braking Automatic braking is a technology for vehicles to sense an imminent collision with another vehicle, person or obstacle; or a danger such as a high brakes or by applying the brakes to slow the vehicle without any driver input. Sensors to detect other vehicles or obstacles can include radar, video, infrared, ultrasonic or other technologies.

Primary Signs of DUI/DWI/Drunk Driving

The signs of impairment contained in the NHTSA list help law enforcement predict whether a driver is likely to have a blood alcohol concentration (BAC) of 0.08% or greater through observation with the naked eye. At present, 0.08% BAC is the minimum BAC required to convict a driver of DUI/DWI in all states. The NHTSA breaks down the list of visual cues of DUI/DWI into are four major categories of driving behavior. Police officers believe that drivers who display these signs indicate at least a 35% chance of a motor vehicle operator being under the influence of alcohol.

Problems maintaining proper lane position—failure to stay within one's driving lane on the road;

Speed and braking difficulties—failure to maintain proper speed, sudden acceleration and braking;

Vigilance problems—failure to pay attention to the surroundings and changing driving conditions;

Judgment problems—inability to judge the road and proximity to objects, such as jerky or sharp turns, sudden movements and over-correction of steering.

Some individual factors, such as a driver weaving across the lanes on the road, indicate an increased probability of DUI or DWI to more than 50%. Combining most of these cues will usually indicate a likelihood of DUI or DWI to greater than 65%. There is an even greater chance of drunk driving when there are indications of swerving, sudden acceleration without cause and driving off of the road.

1. Problems Staying within a Driving Lane:

Drivers who are intoxicated or otherwise impaired by the effects of alcohol experience difficulties with maintaining a consist and steady position within and moving between driving lanes. The most common DUI/DWI indicators include:

Weaving through traffic and across traffic lane lines, perhaps even striking other vehicles or objects outside of the driving lane;

Straddling the road side or center line (driving with one set of wheels on the wrong side of the line);

Drifting towards one side of the road;

Swerving, making abrupt turns in order to straighten out the vehicle;

Making too wide a turn, drifting towards the outside of the turn radius.

2. Speed and Braking Difficulties:

Impaired drivers usually have a difficult time with judging speed and distance while driving, including stopping properly. Common stopping problems that indicate DUI and DWI include:

Coming to a stop at an odd angle;
Stopping the vehicle at a distance noticeably too far from the curb;
Making stops too quickly, jerky and short stops;
Stopping well before or beyond a limit line (such as a crosswalk).

Common acceleration related problems related to intoxication include:

Sudden acceleration or deceleration without apparent reason;
Varying levels of speed, consistently speeding up and slowing down, failure to maintain an even and consistent speed;
Driving at a speed at least 10 or greater miles per hour below the speed limit.

3. Problems with Vigilance, Awareness of Driving Conditions:

The failure to notice traffic conditions on the road, such as traffic control signals or the movement of other vehicles, is another good indicator of the presence of DUI or DWI. Drivers who display an overall lack of awareness that increase the likelihood of being impaired by alcohol include:

Driving the wrong way or in the wrong direction;
Slow responses to traffic control signals;
Stopping or slowing down too quickly for no apparent reason;
Using the wrong side turn signal when making turns or changing lanes;
Driving in the dark without the headlights turned on.

4. Difficulties with Judgments while Driving:

Driving a car, motorcycle, truck or other motor vehicle involves making a continuous set of judgments. A driver must be alert and able to properly gauge distance and speed. When under the influence of alcohol, drivers tend to be more flippant about taking risks. The following signs indicate an increased likelihood of DUI/DWI:

Tailgating, following the vehicle in front too closely;
Making illegal turns or driving in an improper lane;
Unsafe or erratic lane changes (too slow or quick);
Driving off of the road;
Appearance of impairment, head drooping, falling to one side.

The following elements are used by the present invention's formulas to predict most of the primary signs of driving while impaired or driving while distracted to prevent running red lights at intersections and also to prevent accidents along road ways:

The in-vehicle cameras' inputs of traffic lane lines of traversed roads.
The vehicle's course, speed, date/time and coordinates.
The track points' coordinates of roads' center-lines or roads' lanes.
The perpendicular distance 97, the deviation angle 99 (as shown in FIG. 23) and the selected segment width.
The angles between leg segments of the intersection.
The lane width, the lane type and the number of lanes.
The speed limit constraints
The predefined traffic Cases at intersections.
The road sign images designated for their purposes.
The vertical tilt (steepness) of the road.
The horizontal curvature of the road.
The size of the vehicle.
The automatic braking and the inputs from the ABS (anti-lock brakes) and the driver's brake inputs.
The traffic and weather conditions of the roads based on the geographic areas and the seasons.

Note: more elements could be added as well to enhance the present system based on actual field tests.

Reverse engineering is taking apart an object to see how it works in order to duplicate or enhance the object, for the present invention case, this object is monitoring, recording and analyzing the above elements in test vehicles driven by impaired test drivers then to use the results in building mathematic formulas to predict most of the primary signs of driving while impaired/distracted.

As being mentioned before, the in-vehicle database (is referred herein as the main database), contain a first table to locate the geographic section 79 based on the Latitude/Longitude of the moving vehicle as shown in FIG. 14. A second table to locate the segment identification and then the in-vehicle software extracts two intersection identifications from the segment identification, wherein the vehicle is moving between these two intersections based on the Latitude/Longitude of the moving vehicle as shown in FIG. 15, a third table to determine the in-vehicle traffic Case IDs, the threshold delay time for the Cases for the upcoming intersections and their Latitude/Longitude based on the intersection ID, the heading of the vehicle and the segment orientation as shown in FIG. 16. And a fourth table to provide the time phases for a predefined Case as shown in FIG. 17.

In another embodiment of building the in-vehicle database of the virtual trail of track points required for the present in-vehicle system for predicting most of the primary signs of driving while impaired/distracted, the vehicle GPS receiver 28 of the vehicle unit V10 can extensively register the latitude/longitude of the virtual trail of track points of all road-lanes on which the vehicle is routinely traversing, wherein, the track points will be too close to each other to maximize the accuracy of calculating the perpendicular distance 97 and the deviation angle 99 as shown in FIG. 23. Also to maximize the accuracy of indicating when the vehicle is moving in the opposite direction of traffic in the two-way road.

The database of the track points registered by the GPS receiver 28 of the vehicle unit V10 for all road-lanes on which the vehicle is routinely traversing is referred herein as the local database.

The frequent changes in the perpendicular distance 97 and the deviation angle 99 can indicate: Weaving through traffic and across traffic lane lines, straddling the road side or center line, drifting towards one side of the road, swerving and making abrupt turns in order to straighten out the vehicle.

The in-vehicle cameras integrating with the present in-vehicle system of predicting most of the primary signs of driving while impaired/distracted can assist in monitoring the road-way lane markings and the traffic lane lines to confirm when the vehicle is weaving through traffic and across traffic lane lines, straddling the road side or center line, drifting towards one side of the road, swerving and making abrupt turns in order to straighten out the vehicle.

Comparing the deviation angle 99 to the angles between the leg segments of an intersection can indicate: Making too wide a turn, drifting towards the outside of the turn radius.

The speed limit constraints and the frequent changes in: the vehicle's speed and course, the perpendicular distance 97 and the deviation angle 99, can indicate: Coming to a stop at an odd angle, stopping the vehicle at a distance noticeably too far from the curb, making stops too quickly, jerky and short stops, sudden acceleration or deceleration without apparent reason, varying levels of speed, consistently speeding up and slowing down, failure to maintain an even and consistent speed, driving at a speed at least 10 or greater miles per hour below the speed limit.

The predefined traffic Cases, the coordinates of the intersections, the road sign images, the speed limit constraints and the frequent changes in the vehicle's course and speed can indicate: Driving the wrong way or in the wrong direction, slow responses to traffic control signals, stopping or slowing down too quickly for no apparent reason.

The present invention integrates the present autonomous in-vehicle virtual traffic light system with the automatic braking in vehicles. Wherein, the vehicle can determine the red light phase at every predefined upcoming intersection ahead of time by using the autonomous in-vehicle virtual traffic light system, thus to take an appropriate automatic action.

There is a threshold Safe Distance calculated by the in-vehicle software to slow down the vehicle before applying the automatic braking during the stopping distance phase. After determining the in-vehicle traffic Cases and the coordinates for the upcoming intersections. The vehicle detects the possibility of running red lights when no signs of dropping the vehicle speed to certain levels such as below the speed limit of the traversed road within the first part (first phase) of the safe distance, the in-vehicle software takes an immediate action by slowing the vehicle by decreasing the fuel rate (or by other ways relevant to electric vehicles) depending on the vertical slope of the traversed road or by applying the brakes automatically to slow the vehicle down.

And when the vehicle reaches the Stopping Distance phase "the last phase of the Safe Distance", if the driver fails because of distraction or any other reason to apply the brakes and/or the vehicle not sensing the ABS being initiated, running red lights avoidance takes place, brakes are applied, automatically, and the vehicle LCD 40 displays a visual and an audible warning to the driver.

Generally, for the Stopping Distance, at 65 mph the typical passenger car or light pickup truck driver travels a total of 316 feet from the driver perceiving the danger before coming to a final stop. The semi-truck driver takes much longer traveling out 525 feet before coming to a final stop.

Tractor-trailers have larger brakes than passenger cars or light pickup trucks, however due to their weight it takes the big rig much longer to stop than a passenger car. Generally a big rig can weigh up to 80,000 pounds, while a passenger car may weigh about 5000 pounds. General Stopping Distance calculation at 40 mph indicates a passenger car or light pickup truck can come to a full stop in 140 feet from the driver perceiving the danger. The big truck at 40 mph however, travels 180 feet after the driver first perceives the danger before final stop.

It is common knowledge that a big rig takes much longer to stop than a passenger car or pick up truck. Calculating the Stopping Distance for any vehicle involves several different factors.

Factors affecting braking distance for passenger cars and pickup trucks are the condition of the roadway and also the weather conditions. Rain, ice or snow can increase braking distance substantially. Additionally the condition of the roadway and its coefficient of friction can play a part in the calculation of the expected Stopping Distance of a commercial vehicle. Also, the tread on the tires of a large truck and how the brakes are applied as well as the specific condition of the brakes involved will impact Stopping Distance.

Tilt Sensors (Inclinometers angle measurement devices) measure an angular position with reference to gravity and are used in a wide variety of applications from laser levels to seismic monitoring to medical devices. Many Tilt Sensors have precision capable of measuring ranges of arc seconds to 180°.

The Tilt Sensors inside the vehicle determine the steepness of the traversed road. Inclinometers are used to describe the measurement of the steepness of a straight line (the vehicle's axis parallel to the direction of movement). The higher the slope, the steeper the line. When a vehicle going down a ramp it accelerates even without increasing the fuel rate under its weight, thus the Tilt Sensors provide the system with data needed to calculate the Safe Distance down a ramp.

The speed of the vehicle, the steepness of the road, the size of the vehicle and the weather conditions determine the Safe Distance and the Stopping Distance, for instance if the vehicle speed is 40 mph for a passenger car on a dry road, the Safe Distance could start at 200 meter away from the approached intersection, and the last 100 meter of the Safe Distance is the Stopping Distance to fully stop the vehicle a couple dozen of meters just before reaching the intersection. For the same example if it is icy road, the Safe Distance could start at 250 meter away from the intersection and the Stopping Distance could start at 150 meter away from the intersection.

The vehicle position's coordinates can determine the geographic area historical weather data from the in-vehicle database. Also the inputs from the ABS (anti-lock brakes) can indicate how much slippery is the road surface.

Furthermore, when the vehicle reaches a speed close to zero after applying the brakes or the Automatic Braking, the in-vehicle software allows the driver to accelerate the vehicle to proceed in cases such as, when the traffic signal becomes green or when activating a right or left turning signals.

Similarly, when the in-vehicle software detects multiple signs of driving while impaired or driving while distracted, the automatic brakes is activated to gradually drop the vehicle's speed to safe levels such as under 20 mph and the LCD 40 displays visual and audible warning to the driver to stop his vehicle to the side of the road safely along with activating the front and the rear flashers of the vehicle.

Certain additional advantages and features of this invention may be apparent to those skilled in the art upon studying the disclosure, or may be experienced by persons employing the novel system and method of the present invention. Other advantages of the present invention include enhancing traffic safety, reduce cost, reduce accidents rates, death rates, injuries rates and damage rates at intersections.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

The invention claimed is:

1. A system on-board vehicles for predicting a plurality of primary signs of driving while impaired or driving while distracted to reduce road-way accidents, and to prevent running red lights at predefined intersections by a traveling vehicle, the system comprising:
   a) in-vehicle cameras facing roads to monitor traffic lane lines;
   b) in-vehicle automatic brakes;
   c) the autonomous in-vehicle virtual traffic light system comprising: an in-vehicle apparatus integrating with said automatic brakes and said cameras, the in-vehicle apparatus further comprising:
  i) at least one memory comprising non-transitory computer readable media comprising computer program code for one or more programs;
  ii) a database comprising:
    (i) position coordinates of track points along the center line of roads and at center points of intersections for determining, leg segments of intersections, and the angles between the leg segments of each intersection;
    (ii) predefined leg segments associated with predefined intersections;
    (iii) a plurality of predefined cases associated with predefined intersections for generating in-vehicle virtual traffic signal phases autonomously; and,
    (iv) road sign images for determining the speed limits and the traffic conditions of the roads;
  iii) at least one GPS receiver module to enable the vehicle to determine its position coordinates, speed, course and date/time at real-time status; and,
  iv) at least one processor being coupled to said database and said memory;
d) the autonomous in-vehicle virtual traffic light system further comprising a visual display coupled to said in-vehicle apparatus, and able to present visual and audible information, wherein the visual information comprises traffic signal phases and images of road signs, wherein the audible information comprises: indicating traffic signal phases, indicating road sign images, and indicating alerts;
wherein the database and the computer program code are configured to, with the at least one processor, cause the in-vehicle apparatus to determine a plurality of parameters required by mathematic formulas of the system of predicting a plurality of primary signs of driving while impaired or driving while distracted, wherein said plurality of parameters comprise: the status of the traffic signal phases at each upcoming predefined intersection; the distance between the vehicle and each upcoming predefined intersection; a deviation angle; a perpendicular distance from the vehicle's position to the line between two track points between them the vehicle is traveling; the angles between leg segments of the upcoming predefined intersection; and, speed limits.

2. The system of claim 1, wherein predicting a plurality of primary signs of driving while impaired or driving while distracted are determined based at least in part on: monitoring and analyzing the frequent changes in, the perpendicular distance, the deviation angle, and the cameras' inputs of traffic lane lines of a traversed road, to predict signs of weaving through traffic and across traffic lane lines, straddling the road side or center line, drifting towards one side of the road, swerving and making abrupt turns in order to straighten out the vehicle; comparing the vehicle's speed with the speed limit of the traversed road and comparing the deviation angle with the angles between the leg segments of the upcoming predefined intersection to predict signs of coming to a stop at an odd angle, making too wide a turn, drifting towards the outside of the turn radius, making stops too quickly, jerky and short stops, sudden acceleration or deceleration without apparent reason, varying levels of speed, consistently speeding up and slowing down, failure to maintain an even and consistent speed, driving at a speed at least 10 or greater miles per hour below the speed limit; and, monitoring and analyzing the status of the traffic signal phases at the upcoming predefined intersections to predict signs of slow responses to traffic control signals.

3. The system of claim 2, where the in-vehicle apparatus detects a plurality of signs of driving while impaired or driving while distracted, the automatic brakes are activated to gradually drop the vehicle's speed to safe levels in addition to: displaying a visual warning to the vehicle's driver; activating the front and the rear flashers of the vehicle; and, activating an audible warning to the vehicle's driver.

4. The system of claim 2, wherein the perpendicular distance and the deviation angle are determined based at least in part on, the local database, and the main database.

5. The system of claim 1, to prevent running red lights at predefined intersections, wherein the in-vehicle apparatus is configured to determine: the status of the traffic signal phases and the position coordinates associated with each upcoming predefined intersection ahead of time; a threshold safe distance to slow down the vehicle before entering a stopping distance phase; and, a stopping distance to bring the vehicle to a complete halt, wherein the threshold safe distance and the stopping distance are calculated distances between the vehicle and the upcoming intersection.

6. The system of claim 5, comprising the steps of:
  a) calculating the distance between the vehicle and each upcoming predefined intersection to be prepared for entering the threshold safe distance; calculating the threshold safe distance and the stopping distance, wherein the threshold safe distance and the stopping distance are determined based at least in part taking into account the size of the vehicle, the speed of the vehicle, speed limit constraints, the steepness of the road, and the weather conditions, and the stopping distance is the last phase of the threshold safe distance; and,
  b) determining the status of the traffic signal phases associated with each upcoming predefined intersection;
wherein the first phase of the threshold safe distance is used to slow down the vehicle to reach a speed level below the speed limit of the traversed road before applying the automatic brakes during the stopping distance phase in which the status of the traffic signal phase associated with the upcoming predefined intersection is a red signal phase or a stop sign, in addition to not sensing brakes' inputs triggered by the vehicle's driver or no signs of dropping the vehicle speed.

7. The system of claim 6, wherein the vehicle gradually comes to a complete halt a short distance before reaching the upcoming predefined intersection in addition to displaying a visual warning to the vehicle's driver and activating an audible warning when applying the automatic brakes during the stopping distance phase.

* * * * *